United States Patent
Tomioka

(10) Patent No.: US 9,252,654 B1
(45) Date of Patent: Feb. 2, 2016

(54) BRIDGELESS POWER FACTOR IMPROVEMENT CONVERTER

(71) Applicant: TDK Corporation, Minato-ku, Tokyo (JP)

(72) Inventor: Satoshi Tomioka, Tokyo (JP)

(73) Assignee: TDK Corporation (JP)

(*) Notice: Subject to any disclaimer, the term of this patent is extended or adjusted under 35 U.S.C. 154(b) by 0 days.

(21) Appl. No.: 14/639,384

(22) Filed: Mar. 5, 2015

(30) Foreign Application Priority Data

Aug. 6, 2014 (JP) .................................. 2014-160598

(51) Int. Cl.
*H02M 7/217* (2006.01)
*H02M 1/42* (2007.01)
*H02M 1/44* (2007.01)
*G05F 1/70* (2006.01)

(52) U.S. Cl.
CPC .............. *H02M 1/4208* (2013.01); *H02M 1/44* (2013.01)

(58) Field of Classification Search
CPC ... Y02B 70/12; Y02B 70/126; H02M 1/4208; H02M 1/4225; H02M 1/4233; H02M 7/219; G05F 1/70
USPC ...................... 323/205, 207; 363/89, 125, 127
See application file for complete search history.

(56) References Cited

U.S. PATENT DOCUMENTS

| 7,518,895 | B2* | 4/2009 | Shekhawat | H02M 1/34 363/127 |
| 2007/0279955 | A1* | 12/2007 | Liu | H02M 1/4208 363/125 |
| 2008/0316775 | A1* | 12/2008 | Tsai | H02M 3/335 363/21.01 |
| 2010/0188876 | A1* | 7/2010 | Garrity | H02M 1/4225 363/127 |
| 2011/0134671 | A1* | 6/2011 | Balocco | H02M 1/32 363/126 |
| 2015/0138850 | A1* | 5/2015 | Pan | H02M 1/4208 363/37 |
| 2015/0171734 | A1* | 6/2015 | Yu | H02M 1/12 363/45 |

FOREIGN PATENT DOCUMENTS

JP 2012-070490 A 4/2012

* cited by examiner

*Primary Examiner* — Gary L Laxton
(74) *Attorney, Agent, or Firm* — Harness, Dickey & Pierce, P.L.C.

(57) ABSTRACT

A bridgeless power factor improvement converter is configured with input terminals for an AC voltage, output terminals from for a DC output voltage, diodes, first through fourth switches, and coils. A control circuit selectively switches the first through fourth switches according to the AC voltage, a first dead time period (the third switch OFF/the fourth switch ON) in which the first and second switches are in a dead time including a zero-cross point from a positive period to a negative period, and a second dead time period (the third switch ON/the fourth switch OFF) in which the first and second switches are in the dead time including the zero-cross point from the negative period to the positive period. The control circuit maintains the third and fourth switches in the OFF state during a period other than the first and second dead periods.

8 Claims, 13 Drawing Sheets

BRIDGELESS POWER FACTOR IMPROVEMENT CONVERTER

CROSS-REFERENCE TO RELATED APPLICATION

This application claims priority to Japanese Patent Application No. 2014-160598 filed Aug. 6, 2014 which is hereby expressly incorporated by reference herein in its entirety.

BACKGROUND

The present invention relates to a bridgeless power factor improvement converter that does not have a diode bridge circuit that rectifies an input alternating current (AC) voltage.

As this kind of the bridgeless power factor improvement converter (also simply referred to as "a converter" below), Applicant has already proposed a converter that is disclosed in Japanese Patent Publication Number 2012-70490. The converter explained above is configured with an inductor, first and second switching elements, and first and second diodes. Specifically, a first terminal of the inductor is connected to one terminal of an AC power source. A first terminal of the first switching element is connected to a second terminal of the inductor. In the first diode, an anode is connected to a second terminal of the first switching element, and at the same time, a cathode is connected to the other terminal of the AC power source. A first terminal of the second switching element is connected to the second terminal of the inductor. In the second diode, a cathode is connected to a second terminal of the second switching element, and at the same time, an anode is connected to the other terminal of the AC power source.

In the converter that has the configuration explained above, the first switching element is a target of high frequency switching at a positive half cycle of an input voltage (an AC voltage) that is supplied from the AC power source. The second switching element is a target of the high frequency switching at a negative half cycle. Further, during the positive half cycle of the input voltage in which the first switching element is the target of the high frequency switching, the second switching element stays in an OFF state. As a result, the second diode that cooperates with the second switching element also stays in the OFF state. On the other hand, during the negative half cycle of the input voltage in which the second switching element is the target of the high frequency switching, the first switching element stays in the OFF state. As a result, the first diode that cooperates with the first switching element also stays in the OFF state.

Therefore, during the positive half cycle of the input voltage in which the first switching element is the target of the high frequency switching, both ends of the second diode, which stays in the OFF state, are in a state in which an output voltage is applied to the cathode terminal with respect to the anode terminal as a reference. That is, a parasitic capacitor (also referred to as "a parasitic capacitance" below) of the second diode that stays in the OFF state is charged to the output voltage and at the same time, the parasitic capacitance of the first diode that stays in an ON state is discharged so as to be substantially zero volts. On the other hand, during the negative half cycle of the input voltage in which the second switching element is a target of the high frequency switching, both ends of the first diode, which stays in the OFF state, are in a state in which the output voltage is applied to the cathode terminal with respect to the anode terminal as a reference. That is, a parasitic capacitance of the first diode that stays in the OFF state is charged to the output voltage and at the same time, the parasitic capacitance of the second diode that stays in the ON state is discharged so as to be substantially zero volts.

As explained above, immediately after a point (a zero-cross point (a change time)) at which the input voltage is switched from negative to positive or from positive to negative, because the diode that stays in the OFF state is shifted to the ON state, the voltage of both ends of the parasitic capacitance of the diode is discharged from the output voltage to substantially zero volts. Similarly, because the diode that stays in the ON state is shifted to the OFF state, the voltage of both ends of the parasitic capacitance of the diode is charged from zero volts to the output voltage. As a result, the voltage of a node connected between the first diode and the second diode fluctuates by a voltage value of the output voltage.

Therefore, when the switching element that is the target of the high frequency switching starts a switching operation at an normal ON time ratio (because the input voltage is low immediately after the zero-cross point, a large ON time ratio that is prescribed in advance is used) immediately after the zero-cross point, the voltage of both ends of the parasitic capacitance of the diode that stays in the OFF state is rapidly discharged from the output voltage to substantially zero volts, and at the same time, the voltage of both ends of the parasitic capacitance of the diode that stays in the ON state is rapidly charged to the output voltage. As a result, the voltage of the node connected between the first diode and the second diode rapidly fluctuates by the voltage value of the output voltage. Therefore, in this converter, a surge current is generated because the voltage of this node rapidly fluctuates by the voltage value of the output voltage. Further, EMI noise increases.

Accordingly, in the converter that is disclosed in Japanese Patent Publication Number 2012-70490, soft start control is used for a switching element that is a target of high frequency switching immediately after a zero-cross point. The soft start control makes an ON time ratio increase gradually from 0% to a normal ON time ratio. As a result, the discharging and charging operations for the parasitic capacitance of the diode explained above are gradually performed. Thus, because the rapid fluctuation by the voltage value of the output voltage that is generated at the node of each diode is avoided, both the cause of the generation of the surge current and the biggest cause of the EMI noise are removed.

The converter describe above, however, can be improved. That is, in the above converter, because the soft start control in which the ON time ratio is gradually increased for the switching element (a switch) is performed immediately after the zero-cross point of the input voltage, the switching control for the switching element is complicated.

To solve the problems explained above, Applicant has already proposed a technology described below. Specifically, at least one of the first diode and the second diode is connected to a capacitor, which is provided independently or separately from the diode explained above, in parallel. As a result, when each of the switching elements starts to perform the switching operation, a fluctuation by the voltage value of the output voltage that is generated at a node connected between the first and second diodes can be somewhat mitigated and a generated surge current can decrease. According to this technology, because a variation amount (an absolute value of dV/dt) of the voltage at the node explained above can decrease without performing a soft start control for the switching element (a switch) described above, it is possible that a level of the EMI noise is significantly suppressed.

By the way, in the converter in which the generated surge current decreases by the capacitor that is connected to each diode in parallel as explained above, when each capacitor which is connected to each diode in parallel is charged and discharged, the voltage fluctuation of the other terminal of the AC power source, which is fluctuated by the direct current voltage value of the output voltage every time the input voltage is shifted from negative to positive or from positive to negative, is further mitigated by resonating with each capacitor and an inductor that is connected to one terminal of the AC power source.

However, an electric current (a resonance current Ire) that is generated during the resonance explained above flows in the inductor that is connected to the one terminal of the AC power source (that is, as shown in FIG. 21, an input current Iin that is input from the AC power source is superposed with the resonance current Ire). As a result, the superposition between the resonance current Ire and the input current Iin causes a noise outflow to the AC power source. Therefore, it is preferred that the level of the resonance current Ire decreases.

SUMMARY

An object of the present invention is to provide a bridgeless power factor improvement converter that can suppress the EMI noise, and at the same time, decrease a noise outflow to an AC power source.

In order to achieve the above object, a bridgeless power factor improvement converter according to one aspect of the present invention includes: a pair of input terminals to which an AC voltage is input, the pair of the input terminals including a first input terminal and a second input terminal; a pair of output terminals from which an output voltage is output, the pair of the output terminals including a first output terminal and a second output terminal, the first output terminal having a positive potential relative to the second output terminal; a first rectifier having a first current input terminal and a first current output terminal, the first current output terminal being connected to the first output terminal; a first switch that is connected between the second output terminal and the first current input terminal; a second rectifier having a second current input terminal and a second current output terminal, the second current input terminal being connected to the second output terminal; a second switch that is connected between the first output terminal and the second current output terminal; a first coil that is connected between the first input terminal and a first node connected between the first rectifier and the first switch; a second coil that is connected between the first input terminal and a second node connected between the second rectifier and the second switch; a pair of series rectifiers that are connected in series in a forward direction via a third node and that have a series rectifier current input terminal and a series rectifier current output terminal, the series rectifier current output terminal being connected to the first output terminal, the series rectifier current input terminal being connected to the second output terminal, the third node being connected to the second input terminal; a capacitor that is connected to at least one of the pair of the series rectifiers in parallel; a first device that is configured by at least one of a third coil and a resistor and that has a first device terminal and a second device terminal, the first device terminal being connected to the third node; a third switch that is connected between the second output terminal and the second device terminal; a fourth switch that is connected between the first output terminal and the second device terminal; a third rectifier having a third current input terminal and a third current output terminal, the third current input terminal being connected to the second output terminal, the third rectifier being connected to the third switch in parallel; a fourth rectifier having a fourth current input terminal and a fourth current output terminal, the fourth current output terminal being connected to the first output terminal, the fourth rectifier being connected to the fourth switch in parallel; and a control circuit that selectively switches the first through fourth switches according to the AC voltage. The control circuit switches only the first switch during a positive period in which the first input terminal has the positive potential relative to the second input terminal. The control circuit switches only the second switch during a negative period in which the first input terminal has a negative potential relative to the second input terminal. The control circuit maintains the third switch in an OFF state and shifts the fourth switch to an ON state during a first dead time period in which the first and second switches are in a dead time including a first change time from the positive period to the negative period. The control circuit shifts the third switch to the ON state and maintains the fourth switch in the OFF state during a second dead time period in which the first and second switches are in the dead time including a second change time from the negative period to the positive period. Further, the control circuit maintains the third and fourth switches in the OFF state during a period other than the first and second dead periods.

Further, a bridgeless power factor improvement converter according to another aspect of the present invention includes: a pair of input terminals to which an AC voltage is input, the pair of the input terminals including a first input terminal and a second input terminal; a pair of output terminals from which an output voltage is output, the pair of the output terminals including a first output terminal and a second output terminal, the first output terminal having a positive potential relative to the second output terminal; a first rectifier having a first current input terminal and a first current output terminal, the first current output terminal being connected to the first output terminal; a first switch that is connected between the second output terminal and the first current input terminal; a second rectifier having a second current input terminal and a second current output terminal, the second current input terminal being connected to the second output terminal; a second switch that is connected between the first output terminal and the second current output terminal; a first coil that is connected between the first input terminal and a first node connected between the first rectifier and the first switch; a second coil that is connected between the first input terminal and a second node connected between the second rectifier and the second switch; a pair of series rectifiers that are connected in series in a forward direction via a third node and that have a series rectifier current input terminal and a series rectifier current output terminal, the series rectifier current output terminal being connected to the first output terminal, the series rectifier current input terminal being connected to the second output terminal, the third node being connected to the second input terminal; a capacitor that is connected to at least one of the pair of the series rectifiers in parallel; a first semiconductor switching element that is connected in parallel to one of the pair of the series rectifiers having the series rectifier current input terminal which is connected to the second output terminal; a second semiconductor switching element that is connected in parallel to the other of the pair of the series rectifiers having the series rectifier current output terminal which is connected to the first output terminal; and a control circuit that selectively switches the first and second switches and the first and second semiconductor switching elements according to the AC voltage. The control circuit switches only the first switch during a positive period in which the first input terminal has the positive potential relative to the second input terminal. The control circuit switches only the second switch during a negative period in which the first input terminal has a negative potential relative to the second input terminal. The control circuit shifts the first semiconductor switching element to an OFF state during a first dead time period in which the first and second switches are in a dead time including a first change time from the positive period to the negative period and during the second switch is in an ON state. The control circuit shifts the first semiconductor switching element to the ON state in a linear region during a second dead time period in which the first and second switches are in the dead time including a second change time from the negative period to the positive period. The control circuit shifts the first semiconductor switching element to one of the ON state and the OFF state in a saturation region during the first switch is in the ON state. The control circuit shifts the second semiconductor switching element to the OFF state during the second dead time period and during the first switch is in the ON state. The control circuit shifts the second semiconductor switching element to the ON state in the linear region during the first dead time period. Further, the control circuit shifts the second semiconductor switching element to one of the ON state and the OFF state in the saturation region during the second switch is in the ON state.

Further, a bridgeless power factor improvement converter according to another aspect of the present invention includes: a pair of input terminals to which an AC voltage is input, the pair of the input terminals including a first input terminal and a second input terminal; a pair of output terminals from which an output voltage is output, the pair of the output terminals including a first output terminal and a second output terminal, the first output terminal having a positive potential relative to the second output terminal; a first switch that is connected to the second output terminal; a second switch that is connected between the first output terminal and the first switch in series; a coil that is connected between the first input terminal and a first node connected between the first switch and the second switch; a pair of series rectifiers that are connected in series in a forward direction via a second node and that have a series rectifier current input terminal and a series rectifier current output terminal, the series rectifier current output terminal being connected to the first output terminal, the series rectifier current input terminal being connected to the second output terminal, the second node being connected to the second input terminal; a capacitor that is connected to at least one of the pair of the series rectifiers in parallel; a first device that is configured by at least one of a second coil and a resistor and that has a first device terminal and a second device terminal, the first device terminal being connected to the second node; a third switch that is connected between the second output terminal and the second device terminal; a fourth switch that is connected between the first output terminal and the second device terminal; a first rectifier having a first current input terminal and a first current output terminal, the first current input terminal being connected to the second output terminal, the first rectifier being connected to the third switch in parallel; a second rectifier having a second current input terminal and a second current output terminal, the second current output terminal being connected to the first output terminal, the second rectifier being connected to the fourth switch in parallel; and a control circuit that selectively switches the first through fourth switches according to the AC voltage. The control circuit switches only the first switch during a positive period in which the first input terminal has the positive potential relative to the second input terminal. The control circuit switches only the second switch during a negative period in which the first input terminal has a negative potential relative to the second input terminal. The control circuit maintains the third switch in an OFF state and shifts the fourth switch to an ON state during a first dead time period in which the first and second switches are in a dead time including a first change time from the positive period to the negative period. The control circuit shifts the third switch to the ON state and maintains the fourth switch in the OFF state during a second dead time period in which the first and second switches are in the dead time including a second change time from the negative period to the positive period. Further, the control circuit maintains the third and fourth switches in the OFF state during a period other than the first and second dead periods.

Further, a bridgeless power factor improvement converter according to yet another aspect of the present invention includes: a pair of input terminals to which an AC voltage is input, the pair of the input terminals including a first input terminal and a second input terminal; a pair of output terminals from which an output voltage is output, the pair of the output terminals including a first output terminal and a second output terminal, the first output terminal having a positive potential relative to the second output terminal; a first switch that is connected to the second output terminal; a second switch that is connected between the first output terminal and the first switch in series; a coil that is connected between the first input terminal and a first node connected between the first switch and the second switch; a pair of series rectifiers that are connected in series in a forward direction via a second node and that have a series rectifier current input terminal and a series rectifier current output terminal, the series rectifier current output terminal being connected to the first output terminal, the series rectifier current Input terminal being connected to the second output terminal, the second node being connected to the second input terminal; a capacitor that is connected to at least one of the pair of the series rectifiers in parallel; a first semiconductor switching element that is connected in parallel to one of the pair of the series rectifiers having the series rectifier current input terminal which is connected to the second output terminal; a second semiconductor switching element that is connected in parallel to the other of the pair of the series rectifiers having the series rectifier current output terminal which is connected to the first output terminal; and a control circuit that selectively switches the first and second switches and the first and second semiconductor switching elements according to the AC voltage. The control circuit switches only the first switch during a positive period in which the first input terminal has the positive potential relative to the second input terminal. The control circuit switches only the second switch during a negative period in which the first input terminal has a negative potential relative to the second input terminal. The control circuit shifts the first semiconductor switching element to an OFF state during a first dead time period in which the first and second switches are in a dead time including a first change time from the positive period to the negative period and during the second switch is in an ON state. The control circuit shifts the first semiconductor switching element to the ON state in a linear region during a second dead time period in which the first and second switches are in the dead time including a second change time from the negative period to the positive period. The control circuit shifts the first semiconductor switching element to one of the ON state and the OFF state in a saturation region during the first switch is in the ON state. The control circuit shifts the second semiconductor switching element to the OFF state during the second dead time period and during the first switch is in the ON state. The control circuit shifts the second semiconductor switching element to the ON state in the linear region during the first dead time period. Further, the control circuit shifts the second semiconductor switching element to one of the ON state and the OFF state in the saturation region during the second switch is in the ON state.

Further, in the bridgeless power factor improvement converter according to the above aspects of the present invention, the capacitor is provided independently from the pair of the series rectifiers.

In the bridgeless power factor improvement converter according to an embodiment of the present invention, during the first dead time period, because a voltage of the node connected between the pair of the series rectifying devices (rectifiers) is gradually changed from a voltage (zero volts) of the second (the other) output terminal to the same voltage as an output voltage by shifting a second subordinate switch (the fourth switch) to the ON state and discharging the capacitor via a first circuit (the first device). Further, during the second dead time period, because the voltage of the node connected between the pair of the series rectifying devices (rectifiers) is gradually changed from the same voltage as the output voltage to zero volts by shifting a first subordinate switch (the third switch) to the ON state and discharging the capacitor via the first circuit (the first device). As a result, it is possible that a level of a resonance current sufficiently decreases (that is, a noise outflow to the AC voltage is sufficiently decreased). Specifically, the resonance current is generated according to the voltage fluctuation in which the voltage of the node explained above fluctuates by the voltage value of the voltage that corresponds to the same voltage as the output voltage and superposes the input current.

Further, in the bridgeless power factor improvement converter according to an embodiment of the present invention, when the second switch starts to perform a switching operation after the first dead time period ends, the voltage of the node connected between the pair of the series rectifying devices is already shifted to the same voltage as the output voltage and the voltage of each terminal of the series rectifying device, in which the current output terminal is connected to one (the first) output terminal, is substantially the same. Further, when the first switch starts to perform the switching operation after the second dead time period ends, the voltage of the node connected between the pair of the series rectifying devices is already shifted to the voltage (zero volts) of the other (the second) output terminal and the voltage of each terminal of the series rectifying device, in which the current input terminal is connected to the other (the second) output terminal, is substantially the same. Therefore, the level of the surge current that flows to each of the series rectifying devices at the beginning of the switching operations of the first switch and the second switch can be suppressed. As a result, the EMI noise due to the surge current explained above can certainly be suppressed.

In the bridgeless power factor improvement converter according to an embodiment of the present invention, during the first dead time period, the voltage of the node connected between the series the series rectifying devices is gradually shifted from the voltage (zero volts) of the other (the second) output terminal to the voltage that corresponds to the same voltage of the output voltage by shifting the second subordinate switch (the second semiconductor switching element) to the ON state in the linear region (making the second subordinate switch work as a resistor) so as to discharge the capacitor. Further, during the second dead time period, the voltage of the node connected between the series the series rectifying devices is gradually shifted from the voltage that corresponds to the same voltage of the output voltage to zero volts by shifting the first subordinate switch (the first semiconductor switching element) to the ON state in the linear region (making the first subordinate switch work as the resistor) so as to discharge the capacitor. As a result, it is possible that a level of a resonance current sufficiently decreases (that is, a noise outflow to the AC voltage is sufficiently decreased). Specifically, the resonance current is generated according to the voltage fluctuation in which the voltage of the node explained above fluctuates by the voltage value of the voltage that corresponds to the same voltage as the output voltage and superposes the input current.

Further, in the bridgeless power factor improvement converter according to an embodiment of the present invention, when the second switch starts to perform a switching operation after the first dead time period ends, the voltage of the node connected between the pair of the series rectifying devices is already shifted to the same voltage as the output voltage and the voltage of each terminal of the series rectifying device, in which the current output terminal is connected to one (the first) output terminal, is substantially the same. Further, when the first switch starts to perform the switching operation after the second dead time period ends, the voltage of the node connected between the pair of the series rectifying devices is already shifted to the voltage (zero volts) of the other (the second) output terminal and the voltage of each terminal of the series rectifying device, in which the current input terminal is connected to the other (the second) output terminal, is substantially the same. Therefore, the level of the surge current that flows to each of the series rectifying devices at the beginning of the switching operations of the first switch and the second switch can be suppressed. As a result, the EMI noise due to the surge current explained above can certainly be suppressed.

DESCRIPTION OF EXEMPLARY EMBODIMENTS

Figure 1:
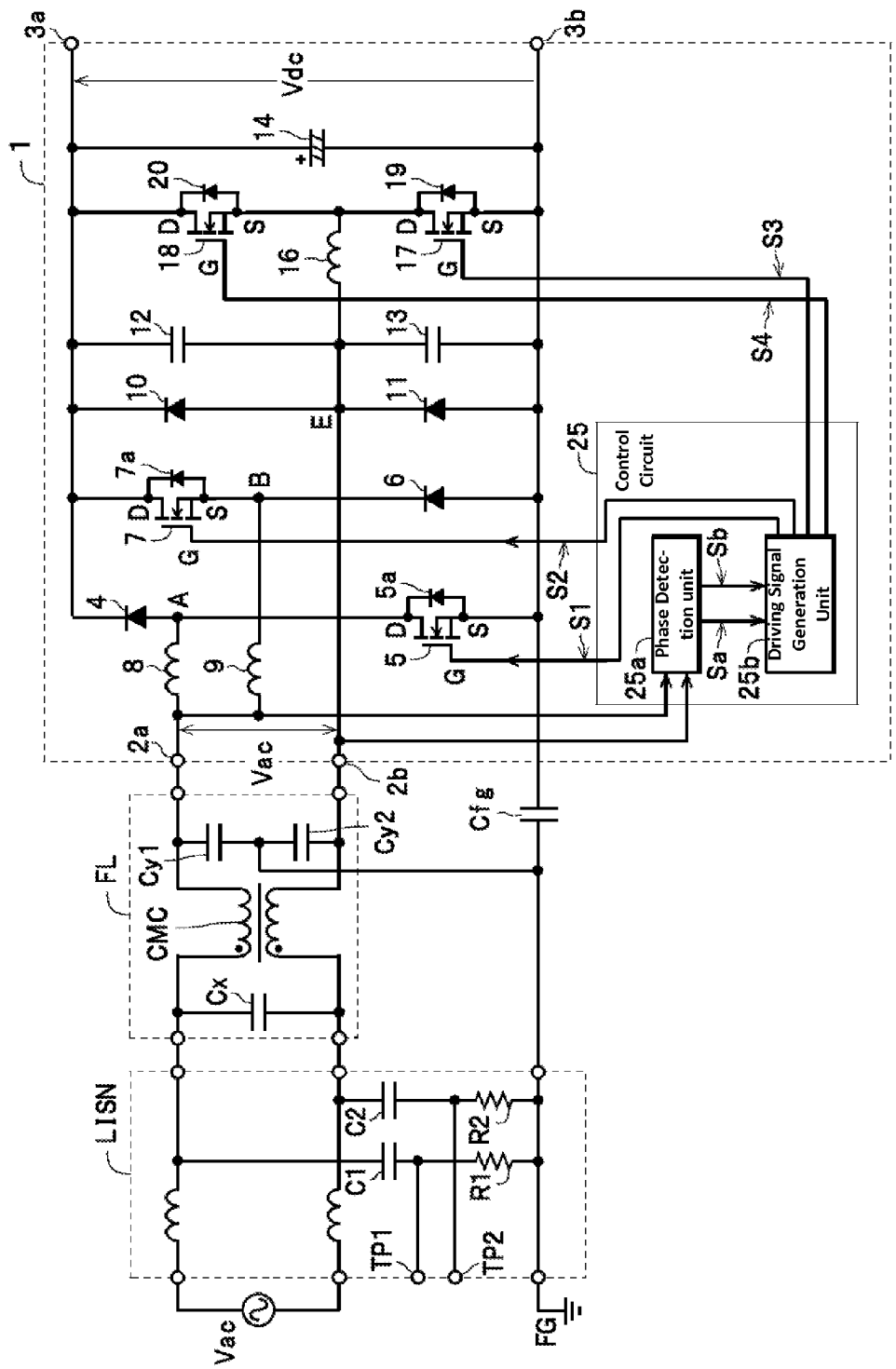
FIG. 1 is a circuit diagram that shows a converter 1 and a measurement circuit for measuring the EMI noise (a noise terminal voltage) according to an embodiment of the present invention.

A bridgeless power factor improvement converter according to an embodiment of the present invention is explained with reference to the drawings.

First, a configuration of a converter 1 shown in FIG. 1 as an example of the bridgeless power factor improvement converter (also referred to as "a converter" below) according to the embodiment of the present invention is explained.

The converter 1 is configured with a pair of input terminals 2a and 2b (also referred to as "a input terminal 2" below when not distinguished), a pair of output terminals 3a and 3b (also referred to as "an output terminal 3" when not distinguished), a first rectifying device 4, a first switch 5, a second rectifying device 6, a second switch 7, a first coil 8, a second coil 9, a pair of series rectifying devices 10 and 11, a pair of parallel capacitors 12 and 13, an output capacitor 14, a first circuit 16 that is configured by at least one component of a coil and a resistor (in the embodiment, as an example, because the first circuit 16 is configured by only the coil, also referred to as "a coil 16" below), a first subordinate switch (a third switch) 17, a second subordinate switch (a fourth switch) 18, a first subordinate rectifying device (a third rectifier) 19, a second subordinate rectifying device (a fourth rectifier) 20 and a control circuit 25.

Further, in the converter 1 explained above, an AC voltage Vac (an AC voltage such as AC 100V of a commercial frequency that corresponds to 50 Hz or 60 Hz) that is input to the pair of the input terminals 2a and 2b is converted into a direct current (DC) voltage Vdc (for instance, about DC 390V). The DC voltage Vdc is output from the pair of the output terminals 3a and 3b as an output voltage. In this case, the DC voltage Vdc is output from between the pair of the output terminals 3a and 3b in which one output terminal 3a of the pair of the output terminals 3a and 3b has a positive potential relative to a potential (a reference potential) of the other output terminal 3b of the pair of the output terminals 3a and 3b.

In the converter 1 explained above, the first rectifying device 4 is, as an example, a diode (also referred to as "a diode 4" below) and a current output terminal of the first rectifying device 4 (in the embodiment, a cathode terminal of the diode 4) is connected to the output terminal 3a. The first switch 5 is connected between a current input terminal of the first rectifying device 4 (in the embodiment, an anode terminal of the diode 4) and the output terminal 3b. In the embodiment of the present invention, the first switch 5 is, as an example, an N channel MOSFET (metal oxide semiconductor field effect transistor). Further, because a drain terminal of the first switch 5 is connected to the anode terminal of the diode 4 and a source terminal of the first switch 5 is connected to the output terminal 3b, the first switch 5 is connected between the anode terminal of the diode 4 and the output terminal 3b. The first switch 5 is shifted to be in an ON state when a driving signal S1 that is output from the control circuit 25 is input (specifically, a logic of a driving signal S1 is a high state (logic high)), and is shifted to be in an OFF state in other situations. Further, a parasitic diode 5a is formed in the first switch 5.

Further, the second rectifying device 6 is, as an example, a diode (also referred to as "a diode 6" below) and a current input terminal of the second rectifying device 6 (in the embodiment, an anode terminal of the diode 6) is connected to the output terminal 3b. The second switch 7 is connected between a current output terminal of the second rectifying device 6 (in the embodiment, a cathode terminal of the diode 6) and the output terminal 3a. In the embodiment of the present invention, the second switch 7 is, as an example, the same N channel MOSFET (metal oxide semiconductor field effect transistor) as the first switch 5. Further, because a drain terminal of the second switch 7 is connected to the output terminal 3a and a source terminal of the second switch 7 is connected to the cathode terminal of the diode 6, the second switch 7 is connected between the cathode terminal of the diode 6 and the output terminal 3a. The second switch 7 is shifted to be in the ON state when a driving signal S2 that is output from the control circuit 25 is input (specifically, a logic of the driving signal S2 is the high state (logic high)), and is shifted to be in the OFF state in other situations. Further, a parasitic diode 7a is formed in the second switch 7.

Further, the first rectifying device 4 and the second rectifying device 6 can also be synchronization rectifying devices such as the MOSFETs (metal oxide semiconductor field effect transistor) that are controlled in order to perform a synchronous rectification operation by the control circuit 25.

One end of the first coil 8 is connected to one input terminal 2a of the pair of the input terminal 2a and 2b and the other end of the first coil 8 is connected to a node A connected between the diode 4 and the first switch 5. One end of the second coil 9 is connected to the input terminal 2a and the other end of the second coil 9 is connected to a node B connected between the diode 6 and the second switch 7.

A series rectifying device 10 that is one of the pair of the series rectifying devices 10 and 11 is, as an example, a diode (also referred to as "a series diode 10" below) and a current output terminal of the series rectifying device 10 (in the embodiment, an cathode terminal of the series diode 10) is connected to the output terminal 3a. A current input terminal of the series rectifying device 10 (in the embodiment, an anode terminal of the series diode 10) is connected to the input terminal 2b. Further, a series rectifying device 11 that is the other of the pair of the series rectifying devices 10 and 11 is, as an example, a diode (also referred to as "a series diode 11" below). Further, a current output terminal of the series rectifying device 11 (in the embodiment, a cathode terminal of the series diode 11) is connected to the input terminal 2b. A current input terminal of the series rectifying device 11 (in the embodiment, an anode terminal of the series diode 11) is connected to the output terminal 3b. Further, a diode in which a reverse direction recovery time is short is used for the series diodes 10 and 11.

A parallel capacitor 12 that corresponds to one of a pair of the parallel capacitors 12 and 13 is another capacitor, which is provided independently or separately from the series diode 10, for instance, such as a ceramic capacitor or a film capacitor, is connected to the series diode 10 in parallel. Further, in the same manner as the parallel capacitor 12, a parallel capacitor 13 that corresponds to the other of the pair of the parallel capacitors 12 and 13 is also another capacitor, which is provided independently or separately from the series diode 11, for instance, such as a ceramic capacitor or a film capacitor, is connected to the series diode 11 in parallel. Further, a parasitic capacitance (a junction capacitance) exists in a diode though a capacitance value is different. The parasitic capacitance (for instance, a capacitance value of from several tens pF to one hundred and several tens pF) exists also in the series rectifying devices 10 and 11. Therefore, capacitance values of the parallel capacitors 12 and 13 are prescribed to be a larger value (for instance, a capacitance value of substantially several hundreds nF) than the capacitance value of the parasitic capacitance. Note that the above "another capacitor, which is provided independently or separately from a series diode 10 (11)" means that unless the another capacitor is a capacitor that is formed in a parasitic manner with respect to the series diode 10 (11), the another capacitor can be any capacitor that is provided independently or separately from the series diode 10 (11). The above is applied to other embodiments below.

Further, in the embodiment, as an example, though the capacitance values of the parallel capacitors 12 and 13 are prescribed to be the same, the capacitance values can also be prescribed to be different. In a general converter including the converter 1, as discussed next, an impedance between the pair of the output terminals 3a and 3b (an output impedance of the converter 1) is configured to be low. Therefore, as a configuration of the parallel capacitors 12 and 13, the parallel capacitors 12 and 13 are equivalently connected in parallel between the input terminal 2b and either one of the output terminals 3a and 3b (for instance, the output terminal 3a). Therefore, when a combined capacitance value of the parallel capacitors 12 and 13 is more than the capacitance value that is prescribed in advance (a reference capacitance value), it is possible that one capacitance value of the parallel capacitors 12 and 13 is increased and the other capacitance value is decreased. Further, it is also possible to adopt a configuration in which the capacitor of which the capacitance value that is more than the reference capacitance value is used as the one of the parallel capacitors 12, 13 and the other of the parallel capacitors 12 and 13 is omitted.

The output capacitor 14 is connected between the pair of the output terminals 3a and 3b. Further, as the output capacitor 14, a capacitor in which the capacitance value is sufficiently large (for instance, an electrolytic capacitor that corresponds to substantially several hundred pF) is used in order to sufficiently decrease the impedance between the pair of the output terminals 3a and 3b (the output impedance of the converter 1).

One end of the first circuit 16 (in the embodiment, the coil 16) is connected to the node E connected between the pair of the series rectifying devices 10 and 11.

The first subordinate switch 17 is connected between the output terminal 3b (the other) and the other end of the first circuit 16 (in the embodiment, the coil 16). In the embodiment of the present invention, the first subordinate switch 17 is, as an example, the N channel MOSFET (metal oxide semiconductor field effect transistor). Further, because a drain terminal of the first subordinate switch 17 is connected to the other end of the coil 16 and a source terminal of the first subordinate switch 17 is connected to the output terminal 3b, the first subordinate switch 17 is connected between the output terminal 3b and the other end of the coil 16. The first subordinate switch 17 is shifted to be in an ON state when a driving signal S3 that is output from the control circuit 25 is input (specifically, a logic of the driving signal S3 is the high state (logic high)), and is shifted to be in an OFF state in other situations. Further, a parasitic diode is formed in the first subordinate switch 17. In the embodiment of the present invention, as an example, this parasitic diode works as the first subordinate rectifying device 19. Further, though an illustration is omitted from the drawings, a configuration, in which another rectifying device (such as a diode) which is provided independently or separately from the first subordinate switch 17 is used as the first subordinate rectifying device 19 and is connected to the first subordinate switch 17 in parallel with the same polarity as the parasitic diode, can also be adopted.

The second subordinate switch 18 is connected to the output terminal 3a (one) and the other end of the first circuit 16 (in the embodiment, the coil 16). In the embodiment of the present invention, the second subordinate switch 18 is, as an example, the N channel MOSFET (metal oxide semiconductor field effect transistor). Further, because a drain terminal of the second subordinate switch 18 is connected to the output terminal 3a and a source terminal of the second subordinate switch 18 is connected to the other end of the coil 16, the second subordinate switch 18 is connected between the output terminal 3a and the other end of the coil 16. The second subordinate switch 18 is shifted to be in an ON state when a driving signal S4 that is output from the control circuit 25 is input (specifically, a logic of the driving signal S4 is the high state (logic high)), and is shifted to be in an OFF state in other situations. Further, a parasitic diode is formed in the second subordinate switch 18. In the embodiment of the present invention, as an example, the parasitic diode works as the second subordinate rectifying device 20. Further, though an illustration is omitted from the drawings, a configuration, in which another rectifying device (such as a diode) which is provided independently or separately from the second subordinate switch 18 is used as the second subordinate rectifying device 20 and is connected to the second subordinate switch 18 in parallel with the same polarity as the parasitic diode, can also be adopted.

The control circuit 25 is configured with a phase detection unit 25a and a driving signal generation unit 25b. The control circuit 25 generates the driving signals S1 and S2 with respect to the first switch 5 and the second switch 7 by switching according to a voltage polarity of the AC voltage Vac while monitoring the state of the AC voltage Vac. Further, the control circuit 25 generates the driving signals S3 and S4 with respect to the first subordinate switch 17 and the second subordinate switch 18 based on a generation time of the driving signals S1 and S2.

Figure 2:
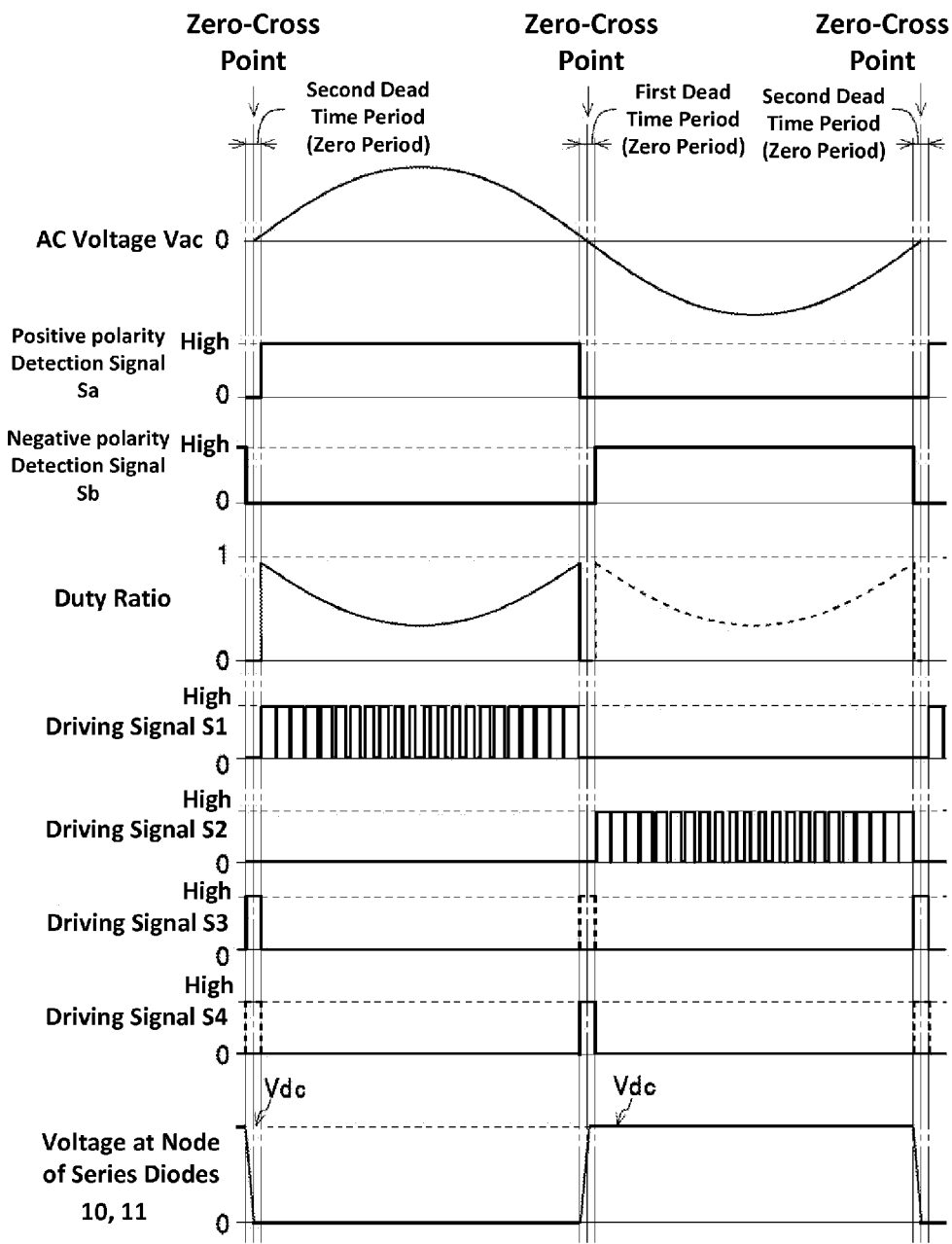
FIG. 2 is a waveform diagram to explain an operation of the converter 1 according to an embodiment of the present invention.

Specifically, as shown in FIG. 2, in the control circuit 25, the phase detection unit 25a monitors the states of the AC voltage Vac and performs an operation for detecting a point (a zero-cross point (a change time)) at which the voltage polarity is switched from negative to positive, or from positive to negative. Further, the phase detection unit 25a generates a positive polarity detection signal Sa and a negative polarity detection signal Sb based on a detection result of the zero-cross point. Specifically, the positive polarity detection signal Sa is logic high during a period in which the polarity of the AC voltage Vac corresponds to positive (a positive period) and is logic zero (a low state) during a period in other situations. Further, the negative polarity detection signal Sb is logic high during a period in which the polarity of the AC voltage Vac corresponds to the negative (a negative period) and is logic zero (a low state) during a period in other situations.

Further, when the phase detection unit 25a generates the positive polarity detection signal Sa and the negative polarity detection signal Sb, the phase detection unit 25a also provides an appropriate length of a logic zero period during which both the polarity detection signals Sa and Sb are logic zero. That is, the phase detection unit 25a adds the appropriate period (a dead time period that includes the zero-cross pointed) during which both of two driving signals S1 and S2 are not output before and after the zero-cross point between the driving signal S1 and the driving signal S2. Specifically, the driving signal S1 is generated based on the positive polarity detection signal Sa and the driving signal S2 is generated based on the negative polarity detection signal Sb by the driving signal generation unit 25b. In the explanation below, the dead time that includes the zero-cross point at which the voltage polarity of the AC voltage Vac is switched from positive to negative regarding the first switch 5 and the second switch 7 is referred to as a first dead time period. The dead time that includes the zero-cross point at which the voltage polarity of the AC voltage Vac is switched from negative to positive regarding the first switch 5 and the second switch 7 is referred to as a second dead time period.

The driving signal generation unit 25b has a configuration in which a pulse signal (a signal that corresponds to logic high during an output period and corresponds to logic zero during a period in other situations) can be generated internally. Specifically, the pulse signal has a higher frequency (for instance, substantially several hundred kHz) than the frequency of the AC voltage Vac. At the time of the generation of the pulse signal, the driving signal generation unit 25b determines whether either of the driving signal S1 and the driving signal S2 is generated and whether neither of the driving signal S1 and the driving signal S2 is generated based on the logics of the positive polarity detection signal Sa and the negative polarity detection signal Sb that are input from the phase detection unit 25a to the driving signal generation unit 25b.

Specifically, as shown in FIG. 2, when both of the logics of the positive polarity detection signal Sa and the negative polarity detection signal Sb correspond to logic zero (during the dead time period explained above), the driving signal generation unit 25b determines that neither of the driving signals S1 and S2 is generated so as to stop the generation of the pulse signals. Therefore, the control circuit 25 stops the output of the driving signals S1 and S2.

Further, in a case in which the driving signal generation unit 25b is in a stop state in which the generation of the pulse signals is stopped, when the driving signal generation unit 25b detects that the logic of the positive polarity detection signal Sa becomes logic high from logic zero, the driving signal generation unit 25b determines to generate the pulse signal as the driving signal S1 and generates the pulse signal as the driving signal S1 during a period that is from this detection time until the logic of the positive polarity detection signal Sa become logic zero from logic high. The driving signal generation unit 25b outputs this driving signal S1 to a gate terminal of the first switch 5. Further, in a case in which the driving signal generation unit 25b is in the stop state explained above, when the driving signal generation unit 25b detects that the logic of the negative polarity detection signal Sb becomes logic high from logic zero, the driving signal generation unit 25b determines to generate the pulse signal as the driving signal S2 and generates the pulse signal as the driving signal S2 during a period that is from this detection point until the logic of the negative polarity detection signal Sb become logic zero from logic high. The driving signal generation unit 25b outputs this driving signal S2 to a gate terminal of the second switch 7.

According to the configuration explained above, based on the AC voltage Vac, except for the dead time period, when the polarity of the AC voltage Vac corresponds to positive (a period in which the voltage of the input terminal 2a has a positive potential relative to the input terminal 2b), the control circuit 25 performs a switching operation for only the first switch 5. Similarly, when the polarity of the AC voltage Vac corresponds to negative (a period in which the voltage of the input terminal 2a has a negative potential relative to the input terminal 2b), the control circuit 25 performs the switching operation for only the second switch 7.

Further, when the driving signal generation unit 25b starts to generate the pulse signals as the driving signal S1 and the driving signal S2, the driving signal generation unit 25b suppresses the fluctuation of the DC voltage Vdc by controlling a duty ratio of the pulse signals within a predetermined variable range based on the following factors. That is, a change of an instantaneous value of the AC voltage Vac that is obtained based on a period length of the logic high of the positive polarity detection signal Sa and the negative polarity detection signal Sb (a length that corresponds to substantially a half cycle of the AC voltage Vac) and an elapsed time from the point of the time in which the logic of the positive polarity detection signal Sa and the negative polarity detection signal Sb is shifted from logic zero to logic high.

Specifically, as shown in FIG. 2, when an absolute value of the instantaneous value of the AC voltage Vac immediately after the driving signal generation unit 25b starts to generate the pulse signal (immediately after the logic of the positive polarity detection signal Sa or the negative polarity detection signal Sb is shifted from logic zero to logic high) is small, the driving signal generation unit 25b sets the duty ratio of the pulse signal to the largest value within the predetermined variable range explained above. After that, the driving signal generation unit 25b makes the duty ratio of the pulse signal decrease gradually according to the increase of the absolute value of the instantaneous value of the AC voltage Vac. Further, when the absolute value of the instantaneous value of the AC voltage Vac becomes the largest value, the driving signal generation unit 25b sets the duty ratio of the pulse signal to the smallest value within the predetermined variable range. After that, the driving signal generation unit 25b makes the duty ratio of the pulse signal increase gradually according to the decrease of the absolute value of the instantaneous value of the AC voltage Vac. Then, when the absolute value of the instantaneous value of the AC voltage Vac immediately before the driving signal generation unit 25b stops generating the pulse signal (immediately before the logic of the positive polarity detection signal Sa or the negative polarity detection signal Sb is shifted from logic high to logic zero) is small, the driving signal generation unit 25b sets the duty ratio of the pulse signal to the largest value within the predetermined variable range. As discussed above, the driving signal generation unit 25b controls the duty ratio of the pulse signals.

Further, based on the generation time of the positive polarity detection signal Sa and the negative polarity detection signal Sb (also corresponding to the generation time of the driving signals S1 and S2), the driving signal generation unit 25b generates a driving signal S3 (a driving signal for a first subordinate switch 17) and a driving signal S4 (a driving signal for a second subordinate switch 18). Specifically, the logic of the driving signal S3 is logic zero during a period in which the logic of either the positive polarity detection signal Sa or the negative polarity detection signal Sb is logic high and during the first dead time period. In contrast, the logic of the driving signal S3 is logic high only during the second dead time period. On the other hand, the logic of the driving signal S4 is logic zero during a period in which the logic of either the positive polarity detection signal Sa or the negative polarity detection signal Sb is logic high and during the second dead time period. In contrast, the logic of the driving signal S4 is logic high only during the first dead time period.

Figure 3:
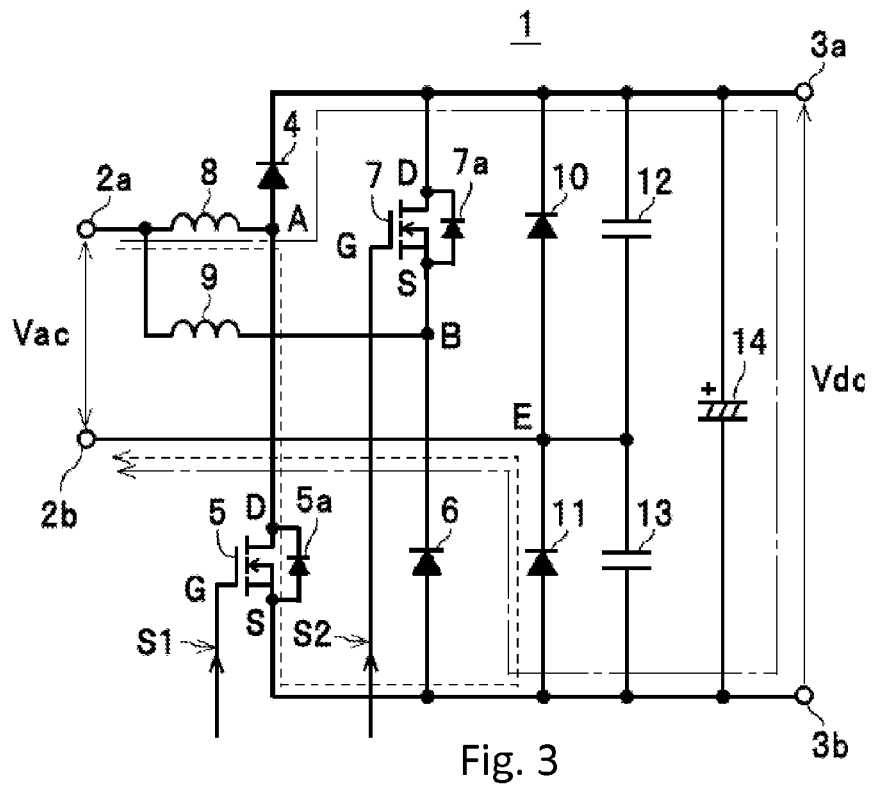
FIG. 3 is a circuit diagram to explain a basic operation of the converter 1 according to an embodiment of the present invention.
Figure 4:
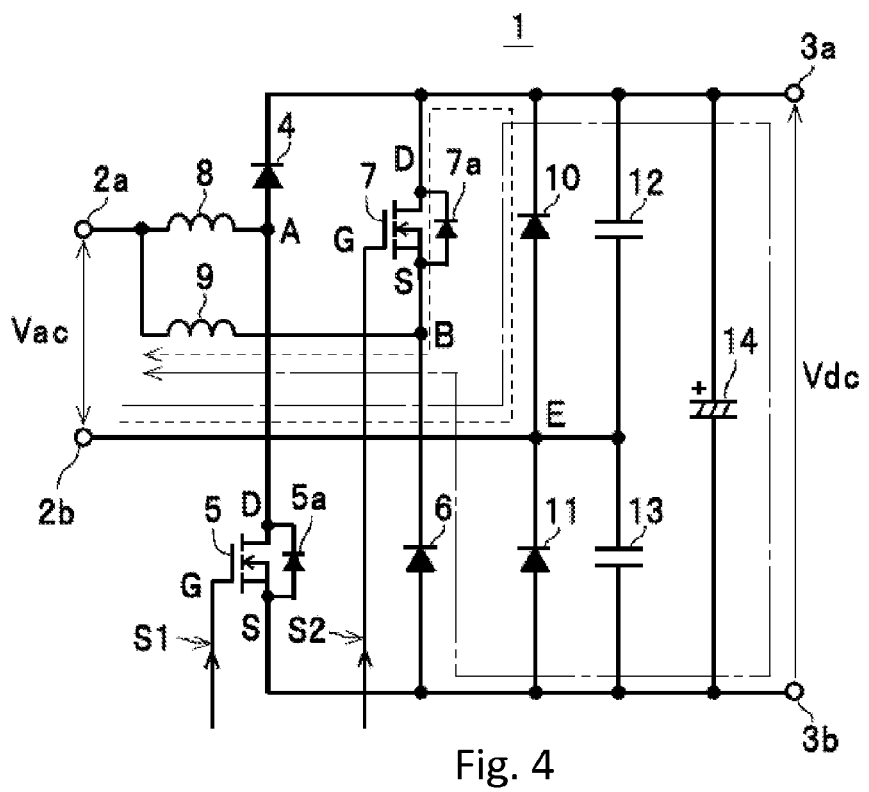
FIG. 4 is a circuit diagram to explain a basic operation of the converter 1 according to an embodiment of the present invention.

Next, an operation of the converter 1 itself is explained with reference to FIGS. 3 and 4. Note that a load (not shown) is connected between the output terminals 3a and 3b. Because the operation of the converter 1 that is explained with reference to FIGS. 3 and 4 is a basic operation during a period other than the first dead time period and the second dead time period, the first circuit 16 (the coil 16), the first subordinate switch 17, the second subordinate switch 18, the first subordinate rectifying device 19 and second subordinate rectifying device 20 that relate to the operation during the first dead time period and the second dead time period are not shown in each of FIGS. 3 and 4.

As explained above, in the converter 1, based on the AC voltage Vac, when the polarity of the AC voltage Vac is positive (a period in which the voltage of the input terminal 2a has a positive potential relative to the input terminal 2b) and during the period other than the first dead time period and the second dead time period, the control circuit 25 maintains the second switch 7 in the OFF state and performs a switching operation for only the first switch 5. In this case, when the first switch 5 is in the ON state, an electric current flows in a path that is indicated by a broken line shown in FIG. 3, i.e., the path starts from the input terminal 2a, via the first coil 8, the first switch 5 in the ON state and the series diode 11 and returns to the input terminal 2b. As a result, energy is accumulated into the first coil 8. Further, in this state, energy is supplied to the load from the output capacitor 14.

When the first switch 5 is shifted from the ON state to the OFF state in this switching state, the energy that is accumulated into the first coil 8 is released. As a result, the electric current flows in a path that is indicated by a dashed line (a long dashed and short dashed line) shown in FIG. 3, i.e., the path starts from the input terminal 2a, via the first coil 8, the diode 4, the output terminal 3a, the load (not shown) (and the output capacitor 14), the output terminal 3b and the series diode 11, and returns to the input terminal 2b. As a result, the DC voltage Vdc is output from between the pair of the output terminals 3a and 3b.

On the other hand, as explained above, based on the AC voltage Vac, when the polarity of the AC voltage Vac is negative (a period in which the voltage of the input terminal 2a has a negative potential relative to the input terminal 2b) and during the period other than the first dead time period and the second dead time period, the control circuit 25 maintains the first switch 5 in the OFF state and performs a switching operation for only the second switch 7. In this case, when the second switch 7 is in the ON state, an electric current flows in a path that is indicated by a dotted line shown in FIG. 4, i.e., the path starts from the input terminal 2b, via the series diode 10, the second switch 7 in the ON state and the second coil 9 and returns to the input terminal 2a. As a result, energy is accumulated into the second coil 9. Further, in this state, energy is supplied to the load from the output capacitor 14.

When the second switch 7 is shifted from the ON state to the OFF state in this switching state, the energy that is accumulated into the second coil 9 is released. As a result, the electric current flows in a path that is indicated by a dashed line (a long dashed and short dashed line) shown in FIG. 4, i.e., the path starts from the input terminal 2b, via the series diode 10, the output terminal 3a, the load (not shown) (and the output capacitor 14), the output terminal 3b, the diode 6 and the second coil 9, and returns to the input terminal 2a. As a result, the DC voltage Vdc is output from between the pair of the output terminals 3a and 3b.

Further, as shown in FIG. 2, in the converter 1, when the polarity of the AC voltage Vac is positive (specifically, in the period in which only the first switch 5 performs the switching operation, i.e., in the period in which the logic of the positive polarity detection signal Sa is logic high), a voltage of a node E (that is, the input terminal 2b) connected between the pair of the series diodes 10 and 11 stays in substantially the same voltage as the voltage of the output terminal 3b because the series diode 11 always stays in the ON state (refer to FIG. 3). Further, in reality, the voltage of the node E connected between the pair of the series diodes 10 and 11 is lower than the voltage of the output terminal 3b by a forward voltage of the series diode 11. However, because the forward voltage of the series diode 11 can be ignored as compared with the DC voltage Vdc, the voltage of the node E connected between the pair of the series diodes 10 and 11 can be regarded as substantially the same as the voltage of the output terminal 3b (zero volts).

On the other hand, when the polarity of the AC voltage Vac is negative (specifically, in the period in which only the second switch 7 performs the switching operation, i.e., in the period in which the logic of the negative polarity detection signal Sb is logic high), the voltage of the node E (that is, the input terminal 2b) connected between the pair of the series diodes 10 and 11 stays in the same voltage as the voltage of the output terminal 3b (the DC voltage Vdc) as shown in FIG. 2 because the series diode 10 always stays in the ON state (refer to FIG. 4).

Therefore, in the converter 1 explained above, as the basic operation, every time the polarity of the AC voltage Vac is switched, the voltage of the node E (that is, the input terminal 2b) connected between the pair of the series diodes 10 and 11 fluctuates by the DC voltage Vdc. Therefore, in the converter 1, as described above with respect to the problems, when the voltage of the node E (that is, the input terminal 2b) connected between the series diodes 10 and 11 rapidly fluctuates (when a variation amount of the voltage (an absolute value of dV/dt) is large), the surge current due to this large fluctuation is generated so that the EMI noise may increase.

In regards to this point, the converter 1 explained above is configured with the first circuit 16 (the coil 16), the first subordinate switch 17, the second subordinate switch 18, the first subordinate rectifying device 19 and the second subordinate rectifying device 20 as well as the configuration (each of the parallel capacitors 12 and 13 that is respectively connected in parallel to each of the series diodes 10 and 11) that is in the explanation of the problems described above. These components are operated as discussed later during each dead time period. Specifically, the voltage of the node E connected between the series diodes 10 and 11 is gradually shifted from zero volts to the DC voltage Vdc during the first dead time period that is provided after the switching period of the first switch 5 (a period in which the logic of the positive polarity detection signal Sa is in logic high). Thereafter, the switching operation of the second switch 7 starts. Further, the voltage of the node E connected between the series diodes 10 and 11 is gradually shifted from the DC voltage Vdc to zero volts during the second dead time period that is provided after the switching period of the second switch 7 (a period in which the logic of the negative polarity detection signal Sb corresponds to logic high). Thereafter, the switching operation of the first switch 5 starts. As a result, a voltage fluctuation by a voltage value of the DC voltage Vdc of the node E that is generated when the polarity of the AC voltage Vac is switched becomes gradual (the variation amount of the voltage (the absolute value of dV/dt) of the node E decreases).

Operations with respect to each of the parallel capacitors 12 and 13, the first circuit 16 (the coil 16), the first subordinate switch 17, the second subordinate switch 18, the first subordinate rectifying device 19 and the second subordinate rectifying device 20 during each dead time period will be independently explained below for each of the first dead time period and the second dead time period.

Figure 5:
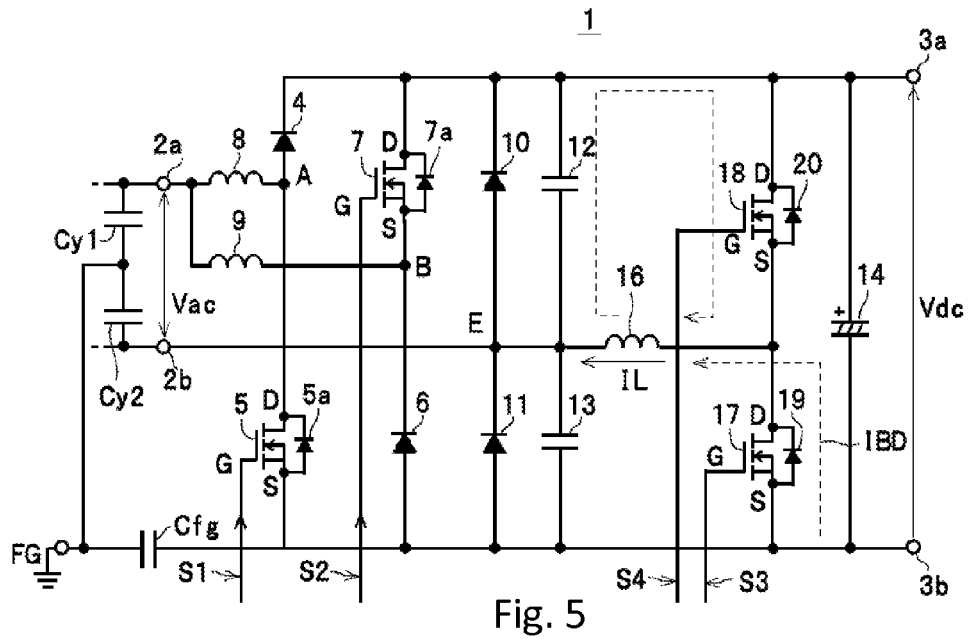
FIG. 5 is a circuit diagram to explain an operation of one aspect of the converter 1 according to an embodiment of the present invention.

First, an operation during the first dead time period that includes the zero-cross point in which the voltage polarity of the AC voltage Vac is switched from positive to negative is explained with reference to FIGS. 5 and 6.

Until immediately before the start of the first dead time period, as shown in FIG. 3, the series diode 11 stays in the ON state. Therefore, the voltage of the node E connected between the pair of the series diodes 10 and 11 at the beginning of the first dead time period stays in substantially the same voltage as the voltage (zero volts) of the output terminal 3b as shown in FIGS. 2 and 6. As a result, at the beginning of the start of the first dead time period, the parallel capacitor 13 is substantially completely discharged (the state in which the end-to-end voltage of the parallel capacitor 13 is substantially zero volts) and the parallel capacitor 12 is charged to substantially the same as the DC voltage Vdc.

Figure 6:
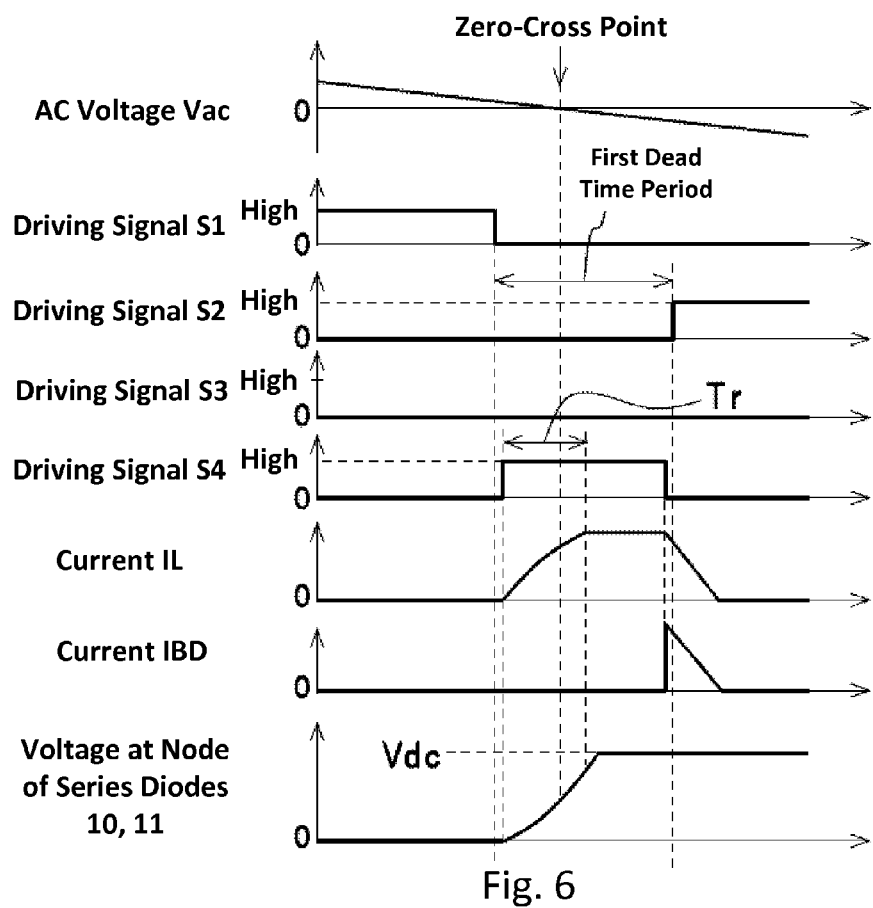
FIG. 6 is a waveform diagram to explain an operation of the converter 1 shown in FIG. 5 according to an embodiment of the present invention.

In this state, as shown in FIGS. 2 and 6, because the control circuit 25 shifts the driving signal S4 to be logic high while the driving signal S3 stays in logic zero, the control circuit 25 shifts only the second subordinate switch 18 among the first subordinate switch 17 and the second subordinate switch 18 to be in the ON state. As a result, the parallel capacitor 12 that is charged to the DC voltage Vdc is short-circuited by the series circuit of the second subordinate switch 18 that is shifted to be in the ON state and the first circuit 16 (in the embodiment, the coil 16). Therefore, as shown in FIG. 5, an electric current IL generated by an LC resonance (the LC resonance of a composite capacitance, which is composed with the parallel capacitors 12 and 13, capacitors Cy1 and Cy2 and a capacitor Cfg, and the coil 16) flows in the coil 16. As a result, the parallel capacitor 12 is gradually discharged, and on the contrary, the parallel capacitor 13 is gradually charged. Therefore, the end-to-end voltage (the voltage of the node E connected between the series diodes 10 and 11) of the parallel capacitor 13 gradually increases.

After that, when an elapsed time from the point of the time in which the logic of the driving signal S4 is shifted to logic high is equal to or more than a time Tr that corresponds to ¼ of a resonance period of the LC resonance explained above, the end-to-end voltage (the voltage of the node E connected between the series diodes 10 and 11) of the parallel capacitor 13 reaches the DC voltage Vdc, and after that, is clamped (is maintained) to be the DC voltage Vdc by the series diode 10. Further, as a result, because a voltage value of the end-to-end voltage of the first circuit 16 (the coil 16) becomes substantially zero volts, a flux change inside of the coil 16 becomes zero. As a result, as shown in FIG. 6, the electric current IL continues to flow with the same current value at the time when the voltage value of the end-to-end voltage of the coil 16 becomes substantially zero volts.

After that, before the end of the first dead time period, the control circuit 25 shifts the second subordinate switch 18 to be in the OFF state from the ON state by shifting the driving signal S4 from logic high to logic zero. In this case, the electric current IL (also corresponds to an electronic current IBD that flows in a parasitic diode of the first subordinate switch 17) continuously flows in the first circuit 16 (the coil 16) from the side of the first subordinate switch 17 to the side of the parallel capacitor 13 via the parasitic diode (the first subordinate rectifying device 19) of the first subordinate switch 17. However, a terminal voltage of the first circuit 16 (the coil 16) at the side of the first subordinate switch 17 is zero volts. On the other hand, a terminal voltage of the first circuit 16 (the coil 16) at the side of the parallel capacitor 13 is the DC voltage Vdc. Therefore, the electric current IL gradually decreases so as to become zero volts.

As explained above, in the converter 1, because the voltage of the node E connected between the series diodes 10 and 11 is gradually shifted to the DC voltage Vdc during the first dead time period by taking about the time Tr, it is possible that a level of a resonance current Ire, which is generated according to the voltage fluctuation in which the voltage of the node E is shifted from zero volts to the DC voltage Vdc, is sufficiently decreased (that is, a noise outflow to the AC voltage Vac is sufficiently decreased). Further, in the converter 1, after the end of the first dead time period, the control circuit 25 starts to output the driving signal S2 so as to perform the switching operation of the second switch 7. As a result, in the converter 1, as shown in FIG. 4, even though the series diode 10 is shifted to always stay in the ON state, the voltage of the node E is already the DC voltage Vdc (that is, the voltage of each terminal of the series diode 10 is substantially the same). Therefore, it is possible that a level of an electric current (the surge current) that flows in the coil (the first coil 8 or the second coil 9) via the series diode 10 is suppressed. As a result, it is possible that the EMI noise due to the electric current explained above (the surge current) is sufficiently suppressed.

As shown in FIG. 1, a general EMC filter FL (for a power source) is connected to the converter 1. Further, the AC voltage Vac is supplied via a LISN (a Line Impedance Stabilizing Network) and the EMC filter FL (for a power source). Under the above configurations, an evaluation experiment is conducted in a state in which a noise voltage spectrum (a noise terminal voltage) between a pair of terminals TP1 and TP2, which is provided at the LISN, is measured. As a result, it has been confirmed that the noise terminal voltage becomes less than a lower limit value of a Class B throughout entire frequency ranges that are defined by the noise regulation. Further, the EMC filter FL (for a power source) is configured with a common mode choke coil CMC, a capacitor Cx between lines and capacitors Cy1 and Cy2 between a line and a frame ground (FG). Further, the LISN is configured with a capacitor C1 and a resistor R1 that are connected in series between one line and the FG, and a capacitor C2 and a resistor R2 that are connected in series between the other line and the FG. The terminal TP1 explained above is connected to a node connected between the capacitor C1 and the resistor R1 and the terminal TP2 explained above is connected to a node connected between the capacitor C2 and the resistor R2. Further, a capacitor Cfg is formed (or is positively provided) between the output terminal 3b of the converter 1 and the FG. For instance, the capacitor Cfg has a capacitance value of substantially several thousand pF.

Next, an operation during the second dead time period that includes the zero-cross point in which the voltage polarity of the AC voltage Vac is switched from negative to positive is explained.

Until immediately before the start of the second dead time period, as shown in FIG. 4, the series diode 10 stays in the ON state. Therefore, the voltage of the node E connected between the pair of the series diodes 10 and 11 at the beginning of the second dead time period stays in substantially the same voltage as the voltage (the DC voltage Vdc) of the output terminal 3a. As a result, at the beginning of the start of the second dead time period, the parallel capacitor 12 is substantially completely discharged (the state in which the end-to-end voltage of the parallel capacitor 12 is substantially zero volts) and the parallel capacitor 13 is charged to substantially the same as the DC voltage Vdc.

In this state, as shown in FIG. 2, because the control circuit 25 shifts the driving signal S3 to be logic high while the driving signal S4 stays in logic zero, the control circuit 25 shift only the first subordinate switch 17 among the first subordinate switch 17 and the second subordinate switch 18 to be in the ON state. As a result, the parallel capacitor 13 that is charged to the DC voltage Vdc is short-circuited by the series circuit of the first subordinate switch 17 that is shifted to be in the ON state and the first circuit 16 (in the embodiment, the coil 16). Therefore, though an illustration is omitted from the drawings, the electric current IL generated by the LC resonance (the LC resonance of the composite capacitance, which is composed with the parallel capacitors 12 and 13, capacitors Cy1 and Cy2 and a capacitor Cfg, and the coil 16) flows in the coil 16 in an opposite direction compared with a state of the first dead time period. As a result, the parallel capacitor 13 is gradually discharged, and on the contrary, the parallel capacitor 12 is gradually charged. Therefore, the end-to-end voltage of the parallel capacitor 12 gradually increases. As a result, the voltage of the node E connected between the pair of the series diodes 10 and 11 gradually decreases.

After that, when an elapsed time from the point of the time in which the logic of the driving signal S3 is shifted to logic high is equal to or more than the time Tr explained above, the end-to-end voltage of the parallel capacitor 12 reaches the DC voltage Vdc. As a result, the voltage of the node E reaches the voltage of the output terminal 3b (zero volts), and after that, is clamped (is maintains) to be this voltage (zero volts) by the series diode 11. Further, as a result, because a voltage value of the end-to-end voltage of the first circuit 16 (the coil 16) becomes substantially zero volts, a flux change inside of the coil 16 becomes zero. Therefore, the electric current IL continues to flow with the same current value at the time when the voltage value of the end-to-end voltage of the coil 16 becomes substantially zero volts.

After that, before the end of the second dead time period, the control circuit 25 shifts the first subordinate switch 17 to be in the OFF state from the ON state by shifting the driving signal S3 from logic high to logic zero. In this case, the electric current IL (also corresponds to an electronic current IBD that flows in a parasitic diode of the second subordinate switch 18) continuously flows in the first circuit 16 (the coil 16) from the side of the parallel capacitor 13 to the side of the second subordinate switch 18 via the parasitic diode (the second subordinate rectifying device 20) of the second subordinate switch 18. However, a terminal voltage of the first circuit 16 (the coil 16) at the side of the parallel capacitor 13 is zero volts. On the other hand, a terminal voltage of the first circuit 16 (the coil 16) at the side of the second subordinate switch 18 is the DC voltage Vdc. Therefore, the electric current IL gradually decreases so as to become zero volts.

As explained above, in the converter 1, because the voltage of the node E connected between the series diodes 10 and 11 is gradually shifted to the voltage (zero volts) of the output terminal 3b during the second dead time period by taking about the time Tr, it is possible that a level of the resonance current Ire, which is generated according to the voltage fluctuation in which the voltage of the node E is shifted from the DC voltage Vdc to zero volts, is sufficiently decreased (that is, a noise outflow to the AC voltage Vac is sufficiently decreased). Further, in the converter 1, after the end of the second dead time period, the control circuit 25 starts to output the driving signal S1 so as to perform the switching operation of the first switch 5. As a result, as shown in FIG. 3, even though the series diode 11 is shifted to always stay in the ON state, the voltage of the node E is already the voltage (zero volts) of the output terminal 3b (that is, the voltage of each terminal of the series diode 11 is substantially the same). Therefore, it is possible that a level of an electric current (the surge current) that flows in the coil (the first coil 8 or the second coil 9) via the series diode 11 is suppressed. As a result, it is possible that the EMI noise due to the electric current explained above (the surge current) is sufficiently suppressed.

Further, in the converter 1 explained above, the first circuit 16 is configured by only the coil. However, the first circuit 16 can be configured by only a resistor instead of the coil and can also be configured by a composite circuit having a coil and a resistor. The composite circuit can be composed of one or more coils and one or more resistors.

Figure 7:
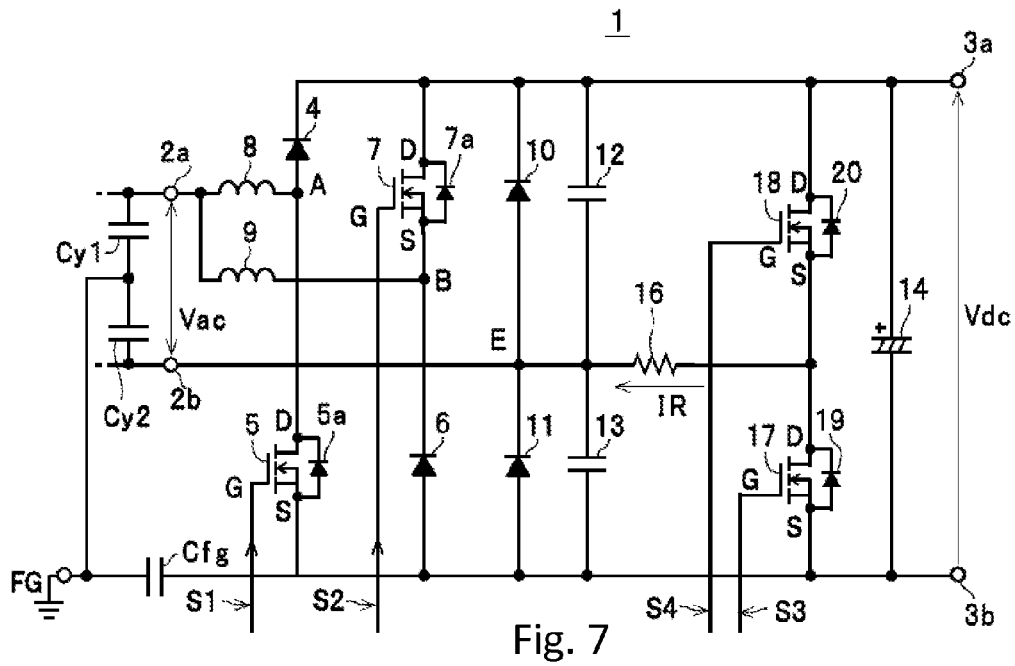
FIG. 7 is a circuit diagram to explain an operation of another aspect of the converter 1 according to an embodiment of the present invention.

As discussed below, as an example, the converter 1 that has the first circuit 16 configured by only a resistor according to an embodiment of the present invention is explained with reference to FIGS. 7 and 8. As compared with the converter 1 that has the first circuit 16 configured by only the coil, this converter 1 explained here has the same configuration except for a configuration of the first circuit 16 configured by only the resistor. Therefore, an explanation with respect to configurations is omitted and only operations are explained. Further, in this embodiment, with respect to operations for periods in which only the first switch 5 performs the switching operation (a period in which the logic of the positive polarity detection signal Sa is logic high) and in which only the second switch 7 performs the switching operation (a period in which the logic of the negative polarity detection signal Sb is logic high) are the same as the operations of the converter 1 that has the first circuit 16 configured by only the coil. Therefore, operations during the first dead time period and the second dead time period are mainly explained.

First, an operation during the first dead time period that includes the zero-cross point in which the voltage polarity of the AC voltage Vac is switched from positive to negative is explained with reference to FIGS. 7 and 8.

A voltage of the node E connected between the pair of the series diodes 10 and 11 at the beginning of the first dead time period stays in substantially the same voltage as the voltage (zero volts) of the output terminal 3b. As a result, at the beginning of the start of the first dead time period, the parallel capacitor 13 is substantially completely discharged (the state in which the end-to-end voltage of the parallel capacitor 13 is substantially zero volts) and the parallel capacitor 12 is charged to substantially the same as the DC voltage Vdc.

Figure 8:
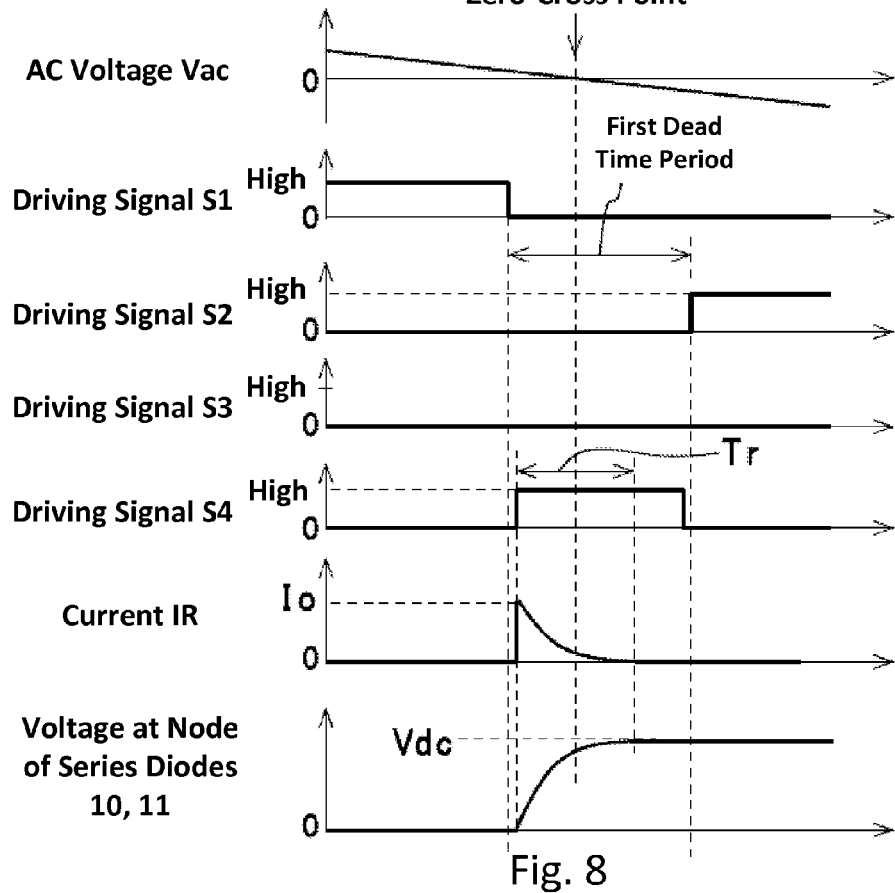
FIG. 8 is a waveform diagram to explain an operation of the converter 1 shown in FIG. 7 according to an embodiment of the present invention.

In this state, as shown in FIG. 8, because control circuit 25 shifts the driving signal S4 to be logic high while the driving signal S3 stays in logic zero, the control circuit 25 shifts only the second subordinate switch 18 among the first subordinate switch 17 and the second subordinate switch 18 to be in the ON state. As a result, the parallel capacitor 12 that is charged to be the DC voltage Vdc is short-circuited by the series circuit of the second subordinate switch 18 that is shifted to be in the ON state and the first circuit 16 (in the embodiment, the resistor 16). Therefore, as shown in FIGS. 7 and 8, an electric current IR in which a current value is gradually decreased from an initial value Io by a time constant τ flows in the resistor 16. The initial value Io is obtained by dividing the DC voltage Vdc by a resistance value R of the resistor 16. Specifically, the time constant τ is determined by a composite capacitance (the composite capacitance which is composed with the parallel capacitors 12, 13, the capacitors Cy1, Cy2 and the capacitor Cfg) and the resistance value R of the resistor 16. As a result, the parallel capacitor 12 is gradually discharged, and on the contrary, the parallel capacitor 13 is gradually charged. Therefore, the end-to-end voltage (the voltage of the node E connected between the series diodes 10 and 11) of the parallel capacitor 13 gradually increases.

After that, when an elapsed time from the point of the time in which the logic of the driving signal S4 is shifted to logic high is equal to a time Tr, which is, for instance, about two to three times longer than the time constant τ explained above, the current value of the electric current IR decreases to a current value that is extremely small. Further, the end-to-end voltage (the voltage of the node E connected between the series diodes 10 and 11) of the parallel capacitor 13 reaches the DC voltage Vdc, and after that, is clamped (is maintained) to be the DC voltage Vdc by the series diode 10. Further, the resistance value of the resistor 16 and each capacitance value of the parallel capacitors 12, 13, the capacitors Cy1, Cy2 and the capacitor Cfg are defined in advance so as to make the time Tr that is about two to three times longer than the time constant τ be shorter than the first dead time period or the second dead time period.

After that, before the end of the first dead time period, the control circuit 25 shifts the logic of the driving signal S4 that is output from logic high to logic zero.

As explained above, in the converter 1, because the voltage of the node E connected between the series diodes 10 and 11 is gradually shifted to the DC voltage Vdc during the first dead time period by taking about the time Tr, it is possible that a level of a resonance current Ire, which is generated according to the voltage fluctuation in which the voltage of the node E is shifted from zero volts to the DC voltage Vdc, is sufficiently decreased. Further, in the converter 1, after the end of the first dead time period, the control circuit 25 starts to output the driving signal S2 so as to perform the switching operation of the second switch 7. As a result, in the converter 1, as shown in FIG. 4, even though the series diode 10 is shifted to always stay in the ON state, the voltage of the node E is already the DC voltage Vdc (that is, the voltage of each terminal of the series diode 10 is substantially the same). Therefore, it is possible that the level of an electric current (the surge current) that flows in the coil (the first coil 8 or the second coil 9) via the series diode 10 is suppressed.

Next, an operation during the second dead time period that includes the zero-cross point in which the voltage polarity of the AC voltage Vac is switched from negative to positive is explained.

The voltage of the node E connected between the pair of the series diodes 10 and 11 at the beginning of the second dead time period stays in substantially the same voltage as the voltage (the DC voltage Vdc) of the output terminal 3a. As a result, at the beginning of the start of the second dead time period, the parallel capacitor 12 is substantially completely discharged (the state in which the end-to-end voltage of the parallel capacitor 12 is substantially zero volts) and the parallel capacitor 13 is charged to substantially the same as the DC voltage Vdc.

In this state, though an illustration is omitted from the drawings, because the control circuit 25 shifts the logic of the driving signal S3 to be logic high while the driving signal S4 stays in logic zero, the control circuit 25 shifts only the first subordinate switch 17 among the first subordinate switch 17 and the second subordinate switch 18 to be in the ON state. As a result, the parallel capacitor 13 that is charged to the DC voltage Vdc is short-circuited by the series circuit of the first subordinate switch 17 that is shifted to be in the ON state and the first circuit 16 (in the embodiment, the resistor 16). Therefore, an electric current IR in which a current value is gradually decreased from an initial value Io by the time constant τ flows in the resistor 16 in an opposite direction compared with a state of the first dead time period. The initial value Io is obtained by dividing the DC voltage Vdc by a resistance value R of the resistor 16. Specifically, the time constant τ is determined by a composite capacitance (the composite capacitance that is composed with the parallel capacitors 12, 13, the capacitors Cy1, Cy2 and the capacitor Cfg) and the resistance value R of the resistor 16. As a result, the parallel capacitor 13 is gradually discharged, and on the contrary, the parallel capacitor 12 is gradually charged. Therefore, the end-to-end voltage of the parallel capacitor 12 gradually increases. As a result, the voltage of the node E of the series diodes 10 and 11 gradually decreases.

After that, when an elapsed time from the point of the time in which the logic of the driving signal S3 is shifted to logic high is equal to or more than the time Tr explained above, the end-to-end voltage of the parallel capacitor 12 reaches the DC voltage Vdc. As a result, the voltage value of the node E reaches the voltage value (zero volts) of the output terminal 3b, and after that, is clamped (is maintains) to be the voltage explained above (zero volts) by the series diode 11.

After that, before the end of the second dead time period, the control circuit 25 shifts the logic of the driving signal S3 that is output from logic high to logic zero.

As explained above, in the converter 1, because the voltage of the node E connected between the series diodes 10 and 11 is gradually shifted to the DC voltage Vdc during the second dead time period by taking about the time Tr, it is possible that a level of a resonance current Ire, which is generated according to the voltage fluctuation in which the voltage of the node E is shifted from zero volts to the DC voltage Vdc, is sufficiently decreased. Further, in the converter 1, after the end of the second dead time period, the control circuit 25 starts to output the driving signal S1 so as to perform the switching operation of the first switch 5. As a result, as shown in FIG. 3, even though the series diode 11 is shifted to always stay in the ON state, the voltage of the node E is already the voltage (zero volts) of the output terminal 3b (that is, the voltage of each terminal of the series diode 11 is substantially the same). Therefore, in the converter 1, it is possible that the level of an electric current (the surge current) that flows in the coil (the first coil 8 or the second coil 9) via the series diode 11 is suppressed.

Thus, in the converter 1, the voltage of the node E connected between the series diodes 10 and 11 is gradually shifted from zero volts to the DC voltage Vdc during the first dead time period by taking about the time Tr by discharging the parallel capacitor 12 via the first circuit 16 because the second subordinate switch 18 is shifted to be in the ON state during the first dead time period. Further, the voltage of the node E is gradually shifted from the DC voltage Vdc to zero volts during the second dead time period by taking about the time Tr by discharging the parallel capacitor 13 via the first circuit 16 because the first subordinate switch 17 is shifted to be in the ON state during the second dead time period. As a result, it is possible that a level of a resonance current Ire, which is generated according to the voltage fluctuation in which the voltage of the node E fluctuates by the DC voltage Vdc, is sufficiently decreased (that is, a noise outflow to the AC voltage Vac is sufficiently decreased).

Further, according to the converter 1 explained above, when the second switch 7 starts to perform the switching operation after the end of the first dead time period, the voltage of the node E is already shifted to the DC voltage Vdc so that the voltages of each of the terminals of the series diode 10 are substantially the same. Further, when the first switch 5 starts to perform the switching operation after the end of the second dead time period, the voltage of the node E is already shifted to the voltage (zero volts) of the output terminal 3b so that the voltages of each of the terminals of the series diode 11 are substantially the same. Therefore, a level of a surge current that flows in the series diodes 10 and 11 at the beginning of the switching operations of the first switch 5 and the second switch 7 can be suppressed. As a result, the EMI noise due to the surge current explained above can certainly be suppressed.

Figure 9:
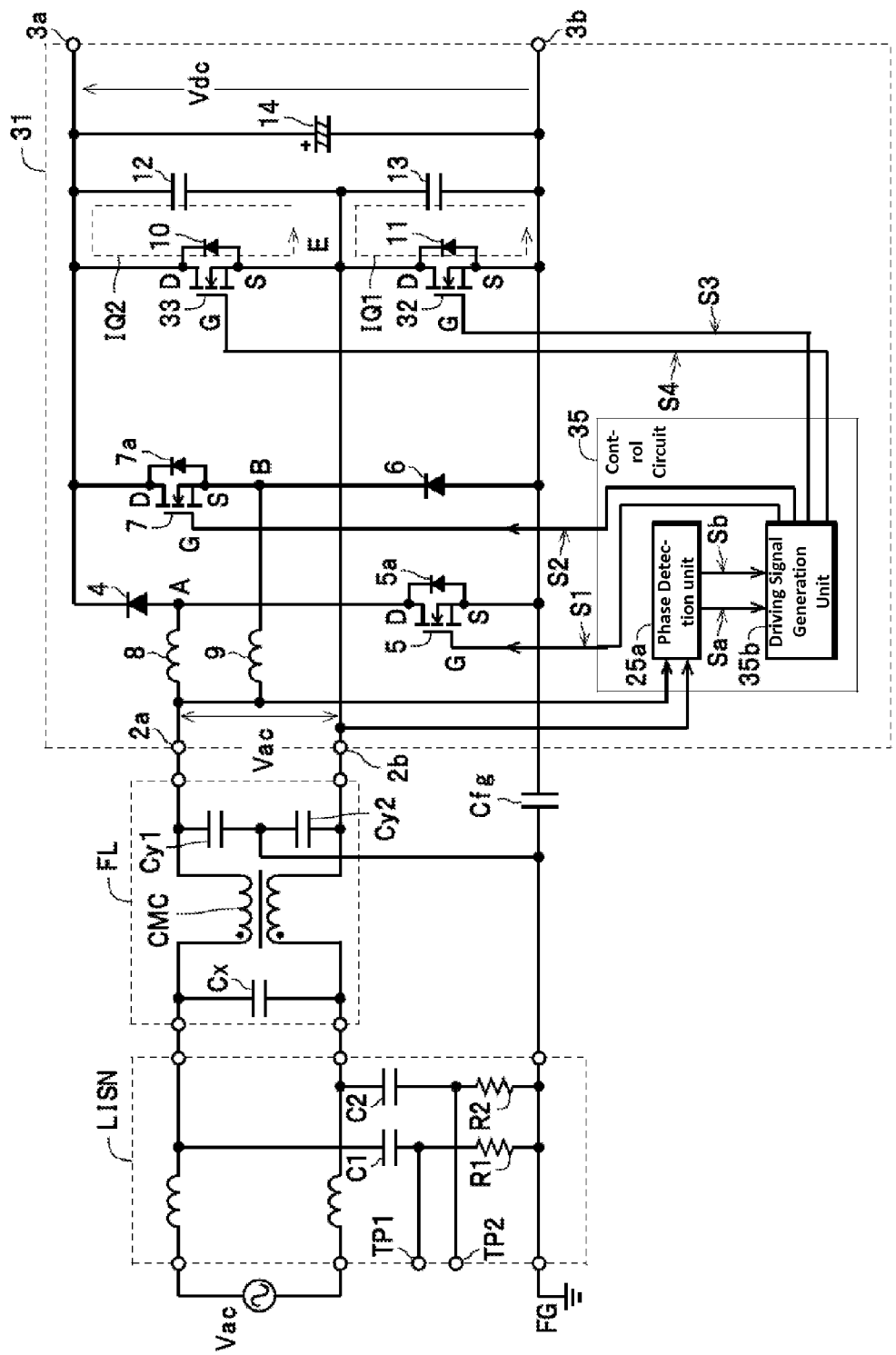
FIG. 9 is a circuit diagram that shows a converter 31 and a measurement circuit for measuring the EMI noise (a noise terminal voltage) according to an embodiment of the present invention.

Further, in the converter 1 that has the two aspects explained above (the aspects in which the first circuit 16 is configured by a coil or a resistor), the configurations having the first circuit 16 are adopted. However, as shown in FIG. 9 as a converter 31, configurations that do not have the first circuit 16 can also be adopted. As discussed below, the converter 31 according to an embodiment of the present invention is explained with reference to the drawings. The redundant explanations with respect to the same configurations as the converter 1 are omitted but the same reference numerals are used for labeling.

The converter 31 is configured with a pair of input terminals 2a and 2b, a pair of output terminals 3a and 3b, a diode 4, a first switch 5, a diode 6, a second switch 7, a first coil 8, a second coil 9, a pair of series rectifying devices 10 and 11, a pair of parallel capacitors 12 and 13, a output capacitor 14, a first subordinate semiconductor switching element 32, a second subordinate semiconductor switching element 33 and a control circuit 35. As compared with the converter 1, the converter 31 explained above has the first subordinate semiconductor switching element 32 and the second subordinate semiconductor switching element 33 instead of the first circuit 16, the first subordinate switch 17, the second subordinate switch 18, the first subordinate rectifying device 19 and the second subordinate rectifying device 20. Further, the converter 31 has the control circuit 35 instead of the control circuit 25 of the converter 1.

Specifically, the first subordinate semiconductor switching element 32 (also referred to as "a first subordinate switch 32" below) and the second subordinate semiconductor switching element 33 (also referred to as "a second subordinate switch 33" below) are configured by a semiconductor switching element such as a bipolar transistor or a field effect transistor. The semiconductor switching element can be operated in any region of either a linear region or a saturation region according to an electric current or a voltage that is applied to a control terminal (such as a base terminal of the bipolar transistor and a gate terminal of the field effect transistor). In this embodiment, as an example, each of the first subordinate switch 32 and the second subordinate switch 33 is configured by the field effect transistor (in the embodiment, as an example, an N channel MOSFET (metal oxide semiconductor field effect transistor)).

Further, the first subordinate switch 32 is connected in parallel to the series rectifying device 11 under the condition in which a current input terminal of the series rectifying device 11 is connected to the other output terminal 3b and a source terminal of the first subordinate switch 32 is connected to the other output terminal 3b. Similarly, the second subordinate switch 33 is connected in parallel to the series rectifying device 10 under the condition in which a current output terminal of the series rectifying device 10 is connected to the one output terminal 3a and a drain terminal of the second subordinate switch 33 is connected to the one output terminal 3a.

Further, each of the first subordinate switch 32 and the second subordinate switch 33 that are respectively configured by the N channel MOSFET (metal oxide semiconductor field effect transistor) has a parasitic diode (not shown). Each parasitic diode is connected to each of the series rectifying devices 10 and 11 in parallel in a manner in which their polarities are the same. Specifically, their cathode terminals are connected to each other. Further, their anode terminals are connected to each other. Therefore, the parasitic diode of the first subordinate switch 32 configured by the N channel MOSFET (metal oxide semiconductor field effect transistor) can be used as the series rectifying device 11. Similarly, the parasitic diode of the second subordinate switch 33 configured by the N channel MOSFET (metal oxide semiconductor field effect transistor) can be used as the series rectifying device 10. As a result, a simple configuration, in which the series rectifying devices 10 and 11 which are independently or separately provided from the first and second subordinate switches 32 and 33 are omitted, can be adopted.

The control circuit 35 is configured with a phase detection unit 25a and a driving signal generation unit 35b. While a state of the AC voltage Vac is monitored, the control circuit 35 alternately generates driving signals S1 and S2 with respect to the first switch 5 and the second switch 7 according to voltage polarities of the AC voltage Vac, respectively. Further, the control circuit 35 generates driving signals S3 and S4 with respect to the first subordinate switch 32 and the second subordinate switch 33 based on the generation time of the driving signals S1 and S2, respectively.

Figure 10:
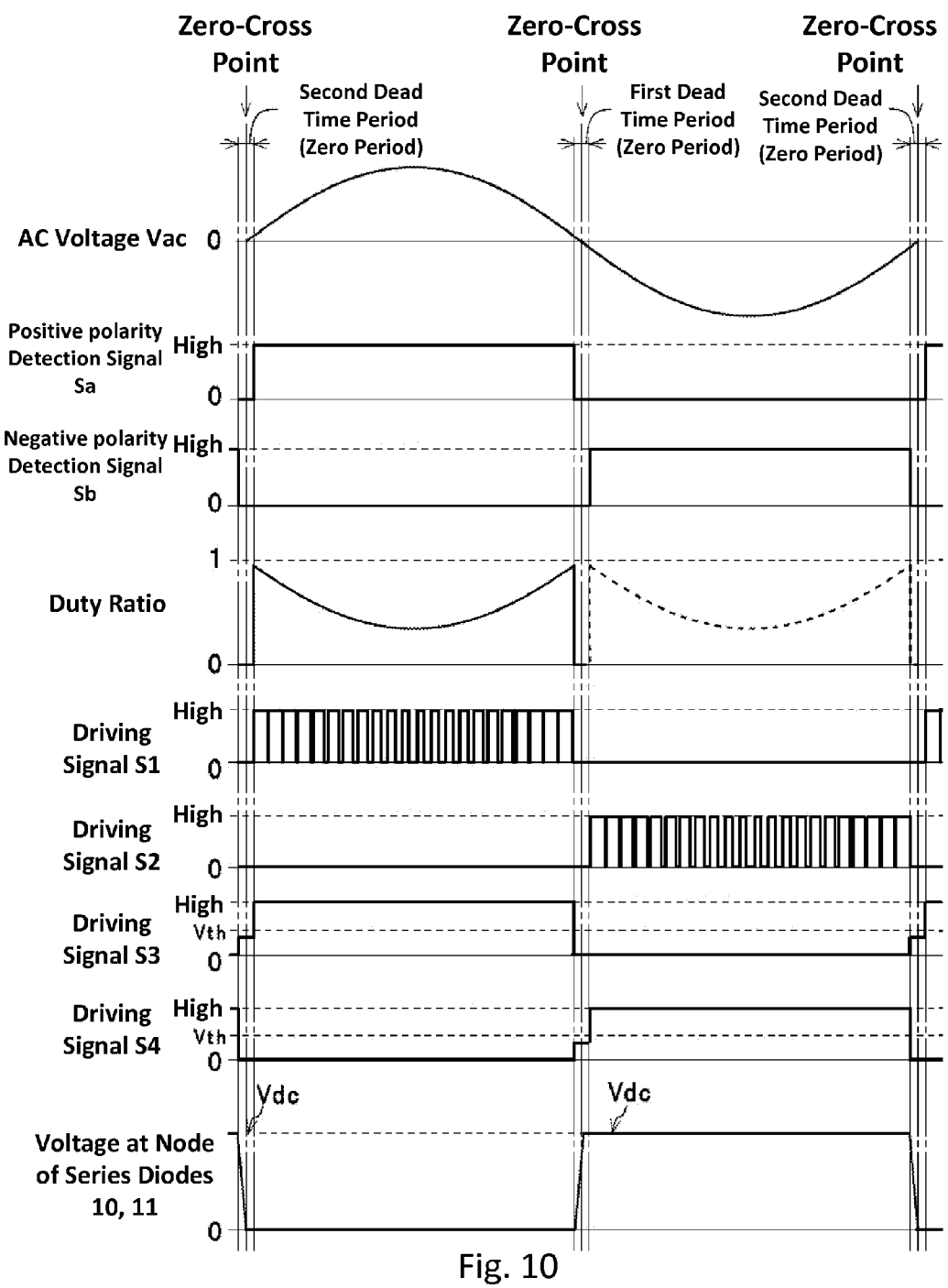
FIG. 10 is a waveform diagram to explain an operation of the converter 31 according to an embodiment of the present invention.

Specifically, in the control circuit 35, the phase detection unit 25a monitors the state of the AC voltage Vac so as to detect the zero-cross point. As shown in FIG. 10, based on a detection result, the phase detection unit 25a generates the positive polarity detection signal Sa and the negative polarity detection signal Sb, and provides an appropriate length of a logic zero period (the first and second dead time periods) during which both the polarity detection signals Sa and Sb are logic zero and between the polarity detection signals Sa and Sb.

As shown in FIG. 10, in the same manner as the driving signal generation unit 25b, when both of the logics of the positive polarity detection signal Sa and the negative polarity detection signal Sb are logic zero (during the dead time period explained above), the driving signal generation unit 35b stops the generation of the pulse signals. Therefore, during the first dead time period and the second dead time period, the control circuit 25 stops the output of the driving signals S1 and S2. Further, in the same manner as the driving signal generation unit 25b, when the driving signal generation unit 35b detects that the logic of the positive polarity detection signal Sa becomes logic high from logic zero, the driving signal generation unit 35b generates the driving signal S1, and then, outputs the driving signal S1 to the gate terminal of the first switch 5 during a period that is from this detection time until the logic of the positive polarity detection signal Sa become logic zero from logic high. Further, in the same manner as the driving signal generation unit 25b, when the driving signal generation unit 35b detects that the logic of the negative polarity detection signal Sb becomes logic high from logic zero, the driving signal generation unit 35b generates the driving signal S2, and then, outputs the driving signal S2 to the gate terminal of the second switch 7 during a period in which from this detection point until the logic of the negative polarity detection signal Sb become logic zero from logic high.

Further, in the same manner as the driving signal generation unit 25b, when the driving signal generation unit 35b starts to generate the pulse signals as the driving signal S1 and the driving signal S2, the driving signal generation unit 35b suppresses the fluctuation of the DC voltage Vdc by controlling a duty ratio of the pulse signals within a predetermined variable range based on the following factors. That is, a change of an instantaneous value of the AC voltage Vac that is obtained based on a period length of the logic high of the positive polarity detection signal Sa and the negative polarity detection signal Sb (a length that corresponds to substantially a half cycle of the AC voltage Vac) and an elapsed time from the point of the time in which the logic of the positive polarity detection signal Sa and the negative polarity detection signal Sb is shifted from logic zero to logic high.

According to the configuration explained above, in the same manner as the control circuit 25, except for each dead time period, when the polarity of the AC voltage Vac corresponds to positive, the control circuit 35 performs a switching operation for only the first switch 5. Similarly, when the polarity of the AC voltage Vac corresponds to negative, the control circuit 35 performs the switching operation for only the second switch 7.

Further, based on the generation time of the positive polarity detection signal Sa and the negative polarity detection signal Sb, during the first dead time period and a period in which the second switch 7 is controlled to be in the ON state (an output period of the negative polarity detection signal Sb), the driving signal generation unit 35b shifts the first subordinate switch 32 to be in the OFF state (a state in which a resistance value between the source terminal and the drain terminal is, for instance, more than several tens MΩ) by controlling a level of the driving signal S3 that is output to the first subordinate switch 32 as shown in FIG. 10. Further, during the second dead time period, the driving signal generation unit 35b shifts the first subordinate switch 32 to be in the ON state in a linear region (a state in which an ON resistance is, for instance, substantially between a several kΩ and ten and several kΩ) by controlling the level of the driving signal S3 that is output to the first subordinate switch 32 as shown in FIG. 10. Further, during a period in which the first switch 5 is controlled to be in the ON state (an output period of the positive polarity detection signal Sa), the driving signal generation unit 35b shifts the first subordinate switch 32 to be in one operation state of the ON state in a saturation region (the ON resistance is, for instance, less than one Ω) and the OFF state by controlling the level of the driving signal S3 that is output to the first subordinate switch 32 as shown in FIG. 10. In this embodiment, as an example, though the first subordinate switch 32 is shifted to be in the ON state in the saturation region as the one operation state, the first subordinate switch 32 can also be shifted to be in the OFF state.

Further, based on the generation time of the positive polarity detection signal Sa and the negative polarity detection signal Sb, during the second dead time period and a period in which the first switch 5 is controlled to be in the ON state (an output period of the positive polarity detection signal Sa), the driving signal generation unit 35b shifts the second subordinate switch 33 to be in the OFF state (a state in which a resistance value between the source terminal and the drain terminal is, for instance, more than several tens MΩ) by controlling a level of the driving signal S4 that is output to the second subordinate switch 33 as shown in FIG. 10. Further, during the first dead time period, the driving signal generation unit 35b shifts the second subordinate switch 33 to be in the ON state in the linear region (a state in which an ON resistance is, for instance, substantially between a several kΩ and ten and several kΩ) by controlling the level of the driving signal S4 that is output to the second subordinate switch 33 as shown in FIG. 10. Further, during a period in which the second switch 7 is controlled to be in the ON state (an output period of the negative polarity detection signal Sb), the driving signal generation unit 35b shifts the second subordinate switch 33 to be in one operation state of the ON state in the saturation region (the ON resistance is, for instance, less than one Ω) or the OFF state by controlling the level of the driving signal S4 that is output to the second subordinate switch 33 as shown in FIG. 10. In this embodiment, as an example, though the second subordinate switch 33 is shifted to be in the ON state in the saturation region as the one operation state, the second subordinate switch 33 can also be shifted to be in the OFF state.

Further, as explained above, the driving signal generation unit 35b selectively shifts the first subordinate switch 32 and the second subordinate switch 33 to an arbitrary state of the following three states: the OFF state (the ON resistance is, for instance, more than several tens MΩ); the ON state in the linear region (the ON resistance is, for instance, substantially between a several kΩ and ten and several kΩ); and the ON state in the saturation region (the ON resistance is, for instance, less than one Ω). A circuit diagram of the driving signal generation unit 35b is explained below with reference to a circuit of the first subordinate switch 32. Further, because a circuit of the second subordinate switch 33 of the driving signal generation unit 35b is the same as the circuit of the first subordinate switch 32, the redundant explanations are omitted.

Figure 12:
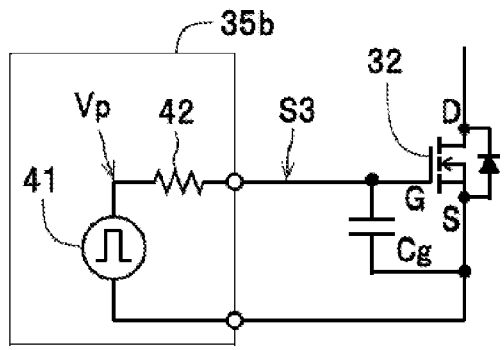
FIG. 12 is a circuit diagram of one example of a driving signal generation unit 35b of the converter 31 according to an embodiment of the present invention.
Figure 13:
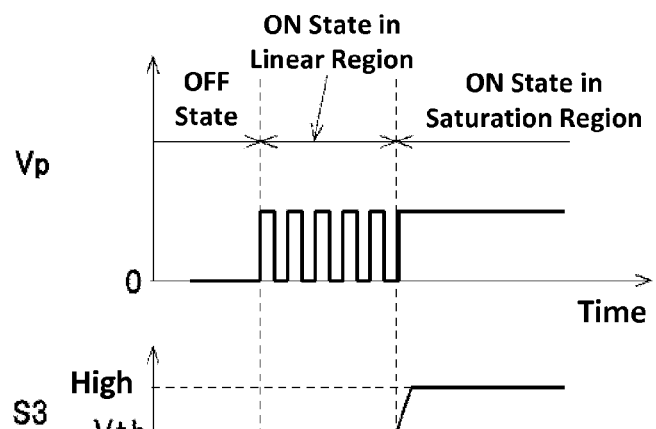
FIG. 13 is a waveform diagram to explain an operation of the driving signal generation unit 35b shown in FIG. 12 according to an embodiment of the present invention.

The circuit of the first subordinate switch 32 of the driving signal generation unit 35b shown in FIG. 12 configured with a pulse signal source 41 that outputs a pulse voltage Vp and an output resistor 42. As shown in FIG. 13, in the circuit explained above, when the first subordinate switch 32 is shifted to be in the OFF state, the pulse signal source 41 stops to output the pulse voltage Vp. When the first subordinate switch 32 is shifted to be in the ON state in the linear region, the pulse signal source 41 outputs the pulse voltage Vp at a predetermined duty ratio. Further, when the first subordinate switch 32 is shifted to be in the ON state in the saturation region, the pulse signal source 41 outputs the pulse voltage Vp at a duty ratio of, for example, 1 (a continuous wave, not a pulse wave). One end of the output resistor 42 is connected to the pulse signal source 41 and the other end of the output resistor 42 is connected to the gate terminal of the first subordinate switch 32. As a result, a gate capacity Cg that exists between the gate terminal and the source terminal of the first subordinate switch 32 is charged via the output resistor 42 during the output of the pulse voltage Vp. Further, the gate capacity Cg is discharged via the output resistor 42 during the stop of the pulse voltage Vp.

Therefore, as shown in FIG. 13, because the pulse signal source 41 outputs the pulse voltage Vp as explained above, the driving signal generation unit 35b that has the configuration shown in FIG. 12 can shift a level of the driving signal S3 to logic zero when the first subordinate switch 32 is shifted to be in the OFF state. Similarly, the driving signal generation unit 35b also can shift the level of the driving signal S3 to over zero volts and less than a threshold voltage Vth of the first subordinate switch 32 (an average voltage of the pulse voltage Vp that is output at the predetermined duty ratio. Also it is referred to as "an intermediate level" below) when the first subordinate switch 32 is shifted to be in the ON state in the linear region. Further, the driving signal generation unit 35b also can shift the level of the driving signal S3 to logic high (a level that exceeds the threshold voltage Vth of the first subordinate switch 32) when the first subordinate switch 32 is shifted to be in the ON state in the saturation region.

Figure 14:
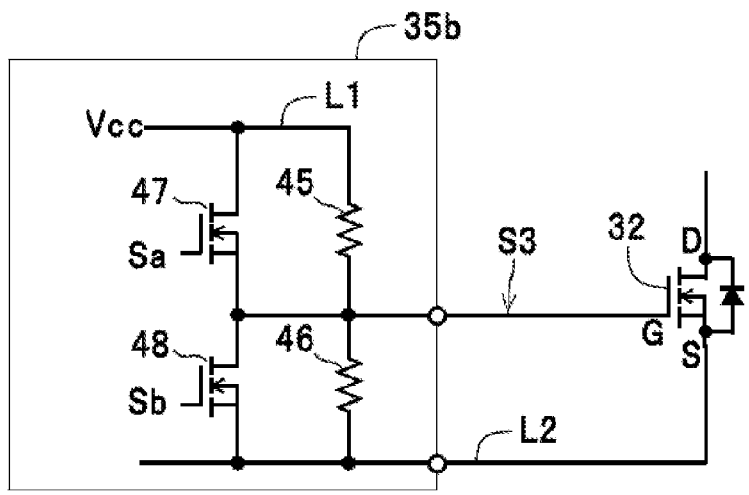
FIG. 14 is a circuit diagram of another example of the driving signal generation unit 35b of the converter 31 according to an embodiment of the present invention.

On the other hand, another circuit of the first subordinate switch 32 of the driving signal generation unit 35b shown in FIG. 14 is configured with two resistors 45 and 46 and switching elements 47 and 48. Specifically, the two resistors 45 and 46 are connected between lines L1 and L2 in series. A voltage value, which is substantially the same as logic high of the driving signal S3, of a voltage Vcc is supplied to the line L1. The line L2 is connected to a source terminal of a corresponding switch (in this embodiment, the first subordinate switch 32). The switching element 47 (in the embodiment, as an example, the N channel MOSFET (metal oxide semiconductor field effect transistor)) is connected to the resistors 45 (the resistor that is connected to the voltage Vcc) in parallel. The switching element 48 (in the embodiment, as an example, the N channel MOSFET (metal oxide semiconductor field effect transistor)) is connected to the resistor 46 (the resistor that is connected to the line L2) in parallel. Further, as shown in FIG. 14, the switching element 47 is driven by the positive polarity detection signal Sa. The switching element 48 is driven by the negative polarity detection signal Sb. Further, a resistance value of each of the resistors 45 and 46 is defined in advance. Specifically, a voltage value of the voltage Vcc that is divided by the resistors 45 and 46 is substantially the same as a level of the driving signal S3 that is in the ON state in the linear region shown in FIG. 13.

Therefore, in the driving signal generation unit 35b shown in FIG. 14, when the first subordinate switch 32 is shifted to be in the OFF state, the following condition is required: a logic of the positive polarity detection signal Sa is logic zero and a logic of the negative polarity detection signal Sb is shifted to be logic high so that a level of the driving signal S3 can be shifted to be logic zero by shifting only the switching element 48 to be in the ON state. Further, in the driving signal generation unit 35b, when the first subordinate switch 32 is shifted to be in the ON state in the linear region, the following condition is required: a logic of the positive polarity detection signal Sa is logic zero and a logic of the negative polarity detection signal Sb is shifted to be logic zero so that a level of the driving signal S3 can be shifted to be the intermediate level as shown in FIG. 13 by shifting both of the switching elements 47 and 48 to be in the ON states. Further, in the driving signal generation unit 35b, when the first subordinate switch 32 is shifted to be in the ON state in the saturation region, the following condition is required: a logic of the positive polarity detection signal Sa is logic high and a logic of the negative polarity detection signal Sb is shifted to be logic zero so that a level of the driving signal S3 can be shifted to be logic high by shifting only the switching element 47 to be in the ON state.

Next, operations of the converter 31 are explained. Further, the operations of the converter 31 during a period in which only the first switch 5 performs the switching operation (a period in which a logic of the positive polarity detection signal Sa is logic high) and during a period in which only the second switch 7 performs the switching operation (a period in which a logic of the negative polarity detection signal Sb is logic high) are the same as the operations of the converter 1 that has the first circuit 16 explained above. Therefore, operations during the first dead time period and the second dead time period are mainly explained.

First, an operation during the first dead time period that includes the zero-cross point in which the voltage polarity of the AC voltage Vac is switched from positive to negative is explained with reference to FIGS. 10 and 11.

Figure 11:
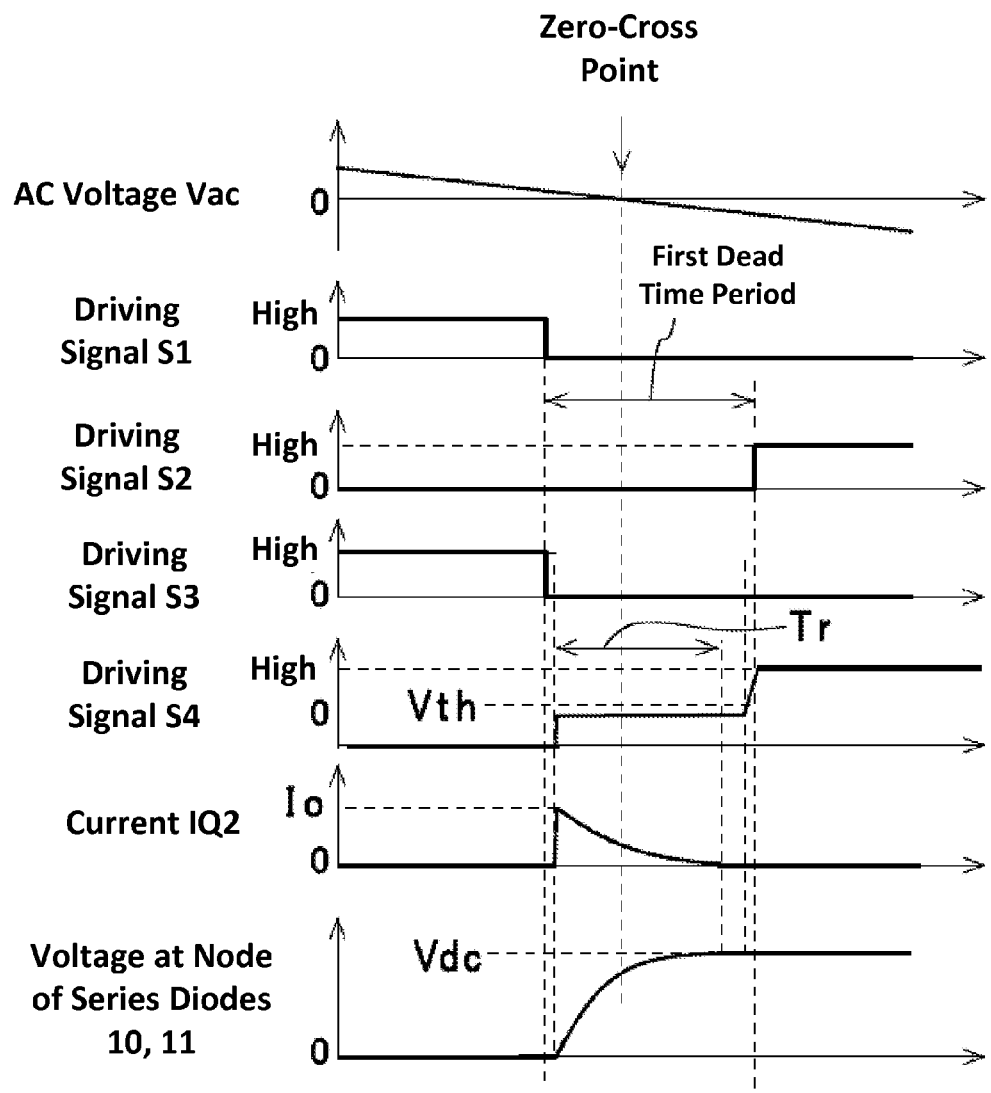
FIG. 11 is a waveform diagram to explain an operation of the converter 31 according to an embodiment of the present invention.

Until immediately before the start of the first dead time period, as shown in FIGS. 10 and 11, the driving signal S3 stays in logic high and the first subordinate switch 32 stays in the ON state (the series diode 11 also stays in the ON state). Therefore, the voltage of the node E connected between the pair of the series diodes 10 and 11 at the beginning of the first dead time period stays in substantially the same voltage as the voltage (zero volts) of the output terminal 3b. As a result, at the beginning of the start of the first dead time period, the parallel capacitor 13 is substantially completely discharged (a state in which the end-to-end voltage of the parallel capacitor 13 is substantially zero volts) and the parallel capacitor 12 is substantially charged to the DC voltage Vdc.

In this state, as shown in FIGS. 10 and 11, because the control circuit 35 shifts the logic of the driving signal S3 to logic zero and shifts the logic of the driving signal S4 to the intermediate level, the control circuit 35 shifts only the second subordinate switch 33 to be in the ON state in the linear region while the first subordinate switch 32 stays in the OFF state. In this case, because the ON resistance of the second subordinate switch 33 is, for instance, substantially between a several kΩ and ten and several kΩ, the second subordinate switch 33 works as a resistor. Thus, the parallel capacitor 12 that is charged to the DC voltage Vdc is short-circuited by the second subordinate switch 33 that became the resistor. Therefore, an electric current IQ2 (refer to FIG. 9) in which a current value is gradually decreased from an initial value Io by a time constant τ flows in the second subordinate switch 33. The initial value Io is obtained by dividing the DC voltage Vdc by a resistance value R of the ON resistance of the second subordinate switch 33. Specifically, the time constant τ is determined by a composite capacitance (the composite capacitance which is composed with the parallel capacitors 12, 13, the capacitors Cy1, Cy2 and the capacitor Cfg) and the resistance value R of the ON resistance. As a result, the parallel capacitor 12 is gradually discharged, and on the contrary, the parallel capacitor 13 is gradually charged. Therefore, the end-to-end voltage of the parallel capacitor 13 (the voltage of the node E connected between the series diodes 10 and 11) gradually increases.

After that, when an elapsed time from the point of the time in which the driving signal S4 is shifted to the intermediate level is equal to a time Tr, which is, for instance, about two to three times longer than the time constant τ explained above, the current value of the electric current 1Q2 decreases to a current value that is extremely small. Further, the end-to-end voltage of the parallel capacitor 13 (the voltage of the node E connected between the series diodes 10 and 11) reaches the DC voltage Vdc, and after that, is clamped (is maintained) to be the DC voltage Vdc by the series diode 10. Further, the resistance value of the ON resistance of the second subordinate switch 33 in the linear region and each capacitance value of the parallel capacitors 12, 13, the capacitors Cy1, Cy2 and the capacitor Cfg are defined in advance so as to make the time Tr that is about two to three times longer than the time constant τ be shorter than the first dead time period.

After that, before the end of the first dead time period, the control circuit 35 shifts the logic of the driving signal S4 that is output from the intermediate level to logic high. As a result, only the second subordinate switch 33 is shifted to be in the ON state in the saturation region.

As explained above, in the converter 31, because the voltage of the node E connected between the series diodes 10 and 11 is gradually shifted to the DC voltage Vdc during the first dead time period by taking about the time Tr, it is possible that a level of a resonance current Ire, which is generated according to the voltage fluctuation in which the voltage of the node E is shifted from zero volts to the DC voltage Vdc, is sufficiently decreased. Further, in the converter 31, after the end of the first dead time period, the control circuit 35 starts to output the driving signal S2 so as to perform the switching operation of the second switch 7. As a result, in the converter 31, as shown in FIG. 9, even though the series diode 10 is shifted to always stay in the ON state, the voltage of the node E is already the DC voltage Vdc (that is, the voltage of each terminal of the series diode 10 is substantially the same). Therefore, it is possible that the level of an electric current (the surge current) that flows in the coil (the first coil 8 or the second coil 9) via the series diode 10 is suppressed.

Next, an operation during the second dead time period that includes the zero-cross point in which the voltage polarity of the AC voltage Vac is switched from negative to positive is explained.

Until immediately before the start of the second dead time period, as shown in FIG. 10, the driving signal S4 stays in logic high and the second subordinate switch 33 stays in the ON state (the series diode 10 also stays in the ON state). Therefore, the voltage of the node E connected between the pair of the series diodes 10 and 11 at the beginning of the second dead time period stays in substantially the same voltage as the voltage (the DC voltage Vdc) of the output terminal 3a. As a result, at the beginning of the start of the second dead time period, the parallel capacitor 12 is substantially completely discharged (a state in which the end-to-end voltage of the parallel capacitor 12 is substantially zero volts) and the parallel capacitor 13 is substantially charged to the DC voltage Vdc.

In this state, as shown in FIG. 10, because the control circuit 35 shifts the logic of the driving signal S4 to be logic zero and shifts the logic of the driving signal S3 to be the intermediate level, the control circuit 35 shifts only the first subordinate switch 32 to be in the ON state in the linear region while the second subordinate switch 33 stays in the OFF state. In this case, because the ON resistance of the first subordinate switch 32 is, for instance, substantially between a several kΩ and ten and several kΩ, the first subordinate switch 32 works as a resistor. Thus, the parallel capacitor 13 that is charged to the DC voltage Vdc is short-circuited by the first subordinate switch 32 that became the resistor. Therefore, an electric current IQ1 (refer to FIG. 9) in which a current value is gradually decreased from an initial value Io by a time constant τ flows to the first subordinate switch 32. The initial value Io is obtained by dividing the DC voltage Vdc by a resistance value R of the ON resistance of the first subordinate switch 32. Specifically, the time constant τ is determined by a composite capacitance (the composite capacitance which is composed with the parallel capacitors 12, 13, the capacitors Cy1, Cy2 and the capacitor Cfg) and the resistance value R of the ON resistance. As a result, the parallel capacitor 13 is gradually discharged, and on the contrary, the parallel capacitor 12 is gradually charged. Therefore, the end-to-end voltage of the parallel capacitor 12 gradually increases. As a result, the voltage of the node E of the series diodes 10 and 11 gradually decreases.

After that, when an elapsed time from the point of the time in which the logic of the driving signal S3 is shifted to the intermediate level is equal to or more than the time Tr explained above, the current value of the electric current IQ1 is decreased to a current value that is extremely small. Further, the end-to-end voltage (the voltage of the node E connected between the series diodes 10 and 11) of the parallel capacitor 12 reaches the DC voltage Vdc. As a result, the voltage of the node E reaches the voltage value (zero volts) of the output terminal 3b, and after that, is clamped (is maintained) to be the voltage explained above (zero volts) by the series diode 11. Further, the resistance value of the ON resistance of the first subordinate switch 32 in the linear region and each capacitance value of the parallel capacitors 12, 13, the capacitors Cy1, Cy2 and the capacitor Cfg are defined in advance so as to make the time Tr that is about two to three times longer than the time constant τ be shorter than the second dead time period.

After that, before the end of the second dead time period, the control circuit 35 shifts the logic of the driving signal S3 that is output from the intermediate level to logic high. As a result, only the first subordinate switch 32 is shifted to be in the ON state in the saturation region.

As explained above, in the converter 31, because the voltage of the node E connected between the series diodes 10 and 11 is gradually shifted to the voltage (zero volts) of the output terminal 3b during the second dead time period by taking about the time Tr, it is possible that a level of a resonance current Ire, which is generated according to the voltage fluctuation in which the voltage of the node E is shifted from the DC voltage Vdc to zero volts, is sufficiently decreased. Further, in the converter 31, after the end of the second dead time period, the control circuit 35 starts to output the driving signal S1 so as to perform the switching operation of the first switch 5. As a result, in the converter 31, as shown in FIG. 9, even though the series diode 11 is shifted to always stay in the ON state, the voltage of the node E is already the voltage (zero volts) of the output terminal 3b (that is, the voltage of each terminal of the series diode 11 is substantially the same). Therefore, in the converter 31, it is possible that the level of an electric current (the surge current) that flows in the coil (the first coil 8 or the second coil 9) via the series diode 11 is suppressed.

Thus, in the converter 31, the voltage of the node E connected between the series diodes 10 and 11 is gradually changed from zero volts to the DC voltage Vdc during the first dead time period by taking about the time Tr by discharging the parallel capacitor 12 because the second subordinate switch 33 is shifted to be in the ON state in the linear region (making the second subordinate switch 33 work as the resistor (a discharging resistor)) during the first dead time period. Further, the voltage of the node E is gradually shifted from the DC voltage Vdc to zero volts during the second dead time period by taking about the time Tr by discharging the parallel capacitor 13 because the first subordinate switch 32 is shifted to be in the ON state in the linear region (making the first subordinate switch 32 work as the resistor (the discharging resistor)) during the second dead time period. As a result, it is possible that a level of a resonance current Ire, which is generated according to the voltage fluctuation in which the voltage of the node E fluctuates by the DC voltage Vdc, is sufficiently decreased (that is, a noise outflow to the AC voltage Vac is sufficiently decreased).

Further, according to the converter 31 explained above, when the second switch 7 starts to perform the switching operation after the end of the first dead time period, the voltage of the node E is already shifted to the DC voltage Vdc so that the voltages of each of the terminals of the series diode 10 are substantially the same. Further, when the first switch 5 starts to perform the switching operation after the end of the second dead time period, the voltage of the node E is already shifted to the voltage (zero volts) of the output terminal 3b so that the voltages of each of the terminals of the series diode 11 are substantially the same. Therefore, a level of a surge current that flows in the series diodes 10 and 11 at the beginning of the switching operations of the first switch 5 and the second switch 7 can be suppressed. As a result, the EMI noise due to the surge current explained above can certainly be suppressed.

Further, as shown in FIGS. 1 and 9, the converters 1 and 31 explained above are configured with the diode 4, the first switch 5, the diode 6, the second switch 7, the first coil 8, the second coil 9 and the pair of the diodes 10 and 11. As the configurations of the converters 1 and 31, a series circuit of the diode 4 and the first switch 5 and a series circuit of the diode 6 and the second switch 7 are connected between the pair of the output terminals 3a and 3b in parallel. Further, the first coil 8 is connected to the node A connected between the diode 4 and the first switch 5. Further, the second coil 9 is connected to the node B connected between the diode 6 and the second switch 7.

Figure 15:
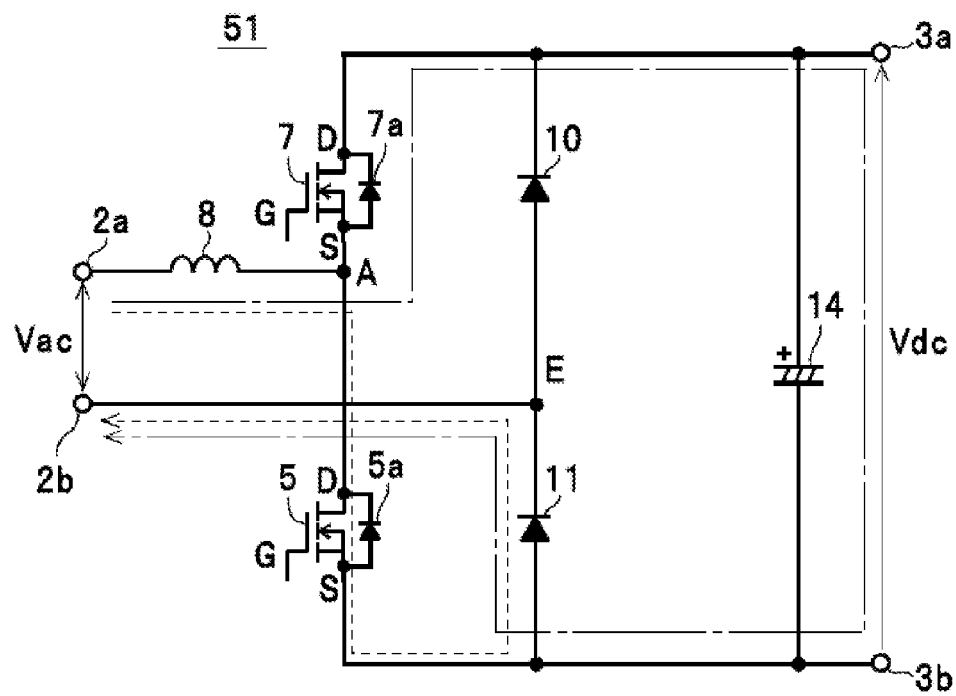
FIG. 15 is a circuit diagram of a converter 51 according to an embodiment of the present invention.

However, a conventional converter 51 shown in FIG. 15 has problems of voltage fluctuations at an input terminal 2b by the DC voltage Vdc. Specifically, in the conventional converter 51, because the input terminal 2b is connected to a node E of a pair of series diodes 10 and 11, as the basic operation, every time the polarity of the AC voltage Vac is switched, the voltage of the input terminal 2b fluctuates by the DC voltage Vcd. Specifically, the converter 51 explained above is configured with a first switch 5 that is connected to an output terminal 3b, a second switch 7 that is connected between the first switch 5 and an output terminal 3b so as to be connected in series with the first switch 5, a first coil 8 and the pair of the diodes 10 and 11. One end of the first coil 8 is connected to an input terminal 2a, and at the same time, the other end of the first coil 8 is connected to a node A connected between the first switch 5 and the second switch 7. The pair of the series diodes 10 and 11 are connected each other in series in the forward direction, and at the same time, a current output terminal thereof is connected to the output terminal 3a, a current input terminal thereof is connected to the output terminal 3b and a node E connected between both terminals is connected to the input terminal 2b.

Figure 16:
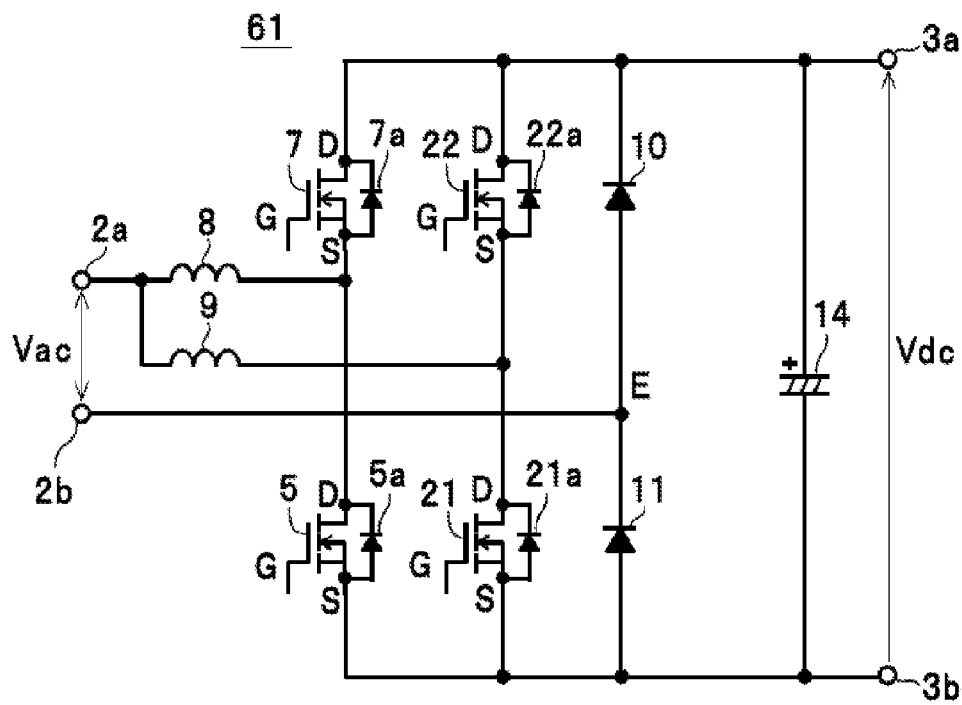
FIG. 16 is a circuit diagram of a converter 61 according to an embodiment of the present invention

Further, a conventional converter 61 shown in FIG. 16 also has the problems performs of voltage fluctuations at an input terminal 2b by the DC voltage Vdc. Specifically, in the conventional converter 61, because the input terminal 2b is connected to a node E of a pair of series diodes 10 and 11, as the basic operation, every time the polarity of the AC voltage Vac is switched, the voltage of the input terminal 2b fluctuates by the DC voltage Vcd. Specifically, the conventional converter 61 corresponds to a so-called interleave system bridgeless power factor improvement converter and is configured by connecting two sets of switching circuits explained below between output terminals 3a and 3b in parallel. Specifically, the converter 61 is configured with the two sets of the switching circuits (a set of a series circuit of a first switch 5, a second switch 7 and a first coil 8, and a set of a series circuit of a third switch 21, a forth switch 22 and a second coil 9) that are functionally equivalent with the switching circuit of the converter 51 (the series circuit of the first switch 5 and the second switch 7, and the first coil 8).

Figure 17:
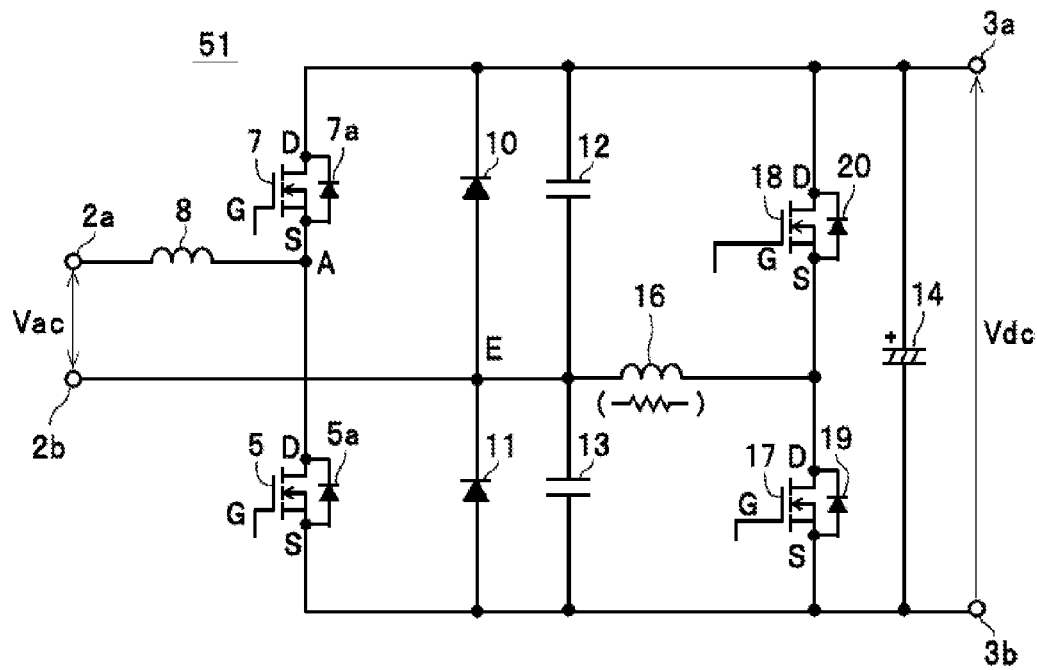
FIG. 17 is a circuit diagram of the converter 51 in which configurations of the converter 1 are applied according to an embodiment of the present invention.
Figure 18:
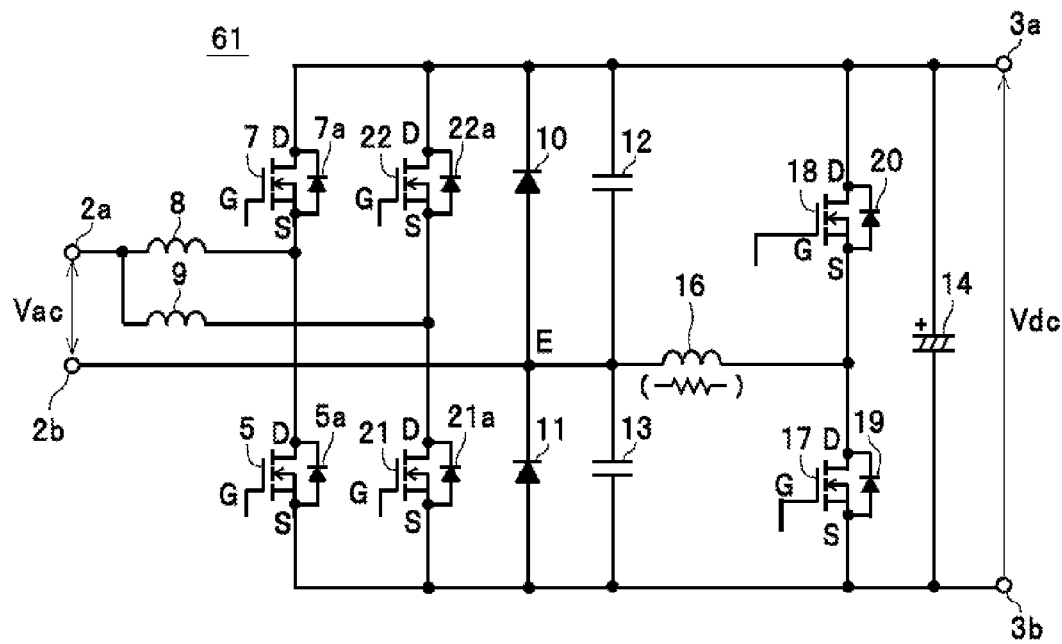
FIG. 18 is a circuit diagram of the converter 61 in which configurations of the converter 1 are applied according to an embodiment of the present invention.

Therefore, in the conventional converters 51 and 61, when the voltage of the node E of the series diodes 10 and 11 rapidly fluctuates, due to this, it is possible that a resonance current Ire in a large level and a surge current occur (the EMI noise increases due to this surge current). However, in the converters 51 and 61, the level of the resonance current Ire, which is generated according to the voltage fluctuation in which the voltage of the node E is fluctuated by the DC voltage Vdc, can be sufficiently decreased (that is, can sufficiently decrease a noise outflow to the AC voltage Vac) by providing a pair of parallel capacitors 12 and 13, a first circuit 16, a first subordinate switch 17, a second subordinate switch 18, a first subordinate rectifying device 19, a second subordinate rectifying device 20 and a control circuit 25 in the same manner as the converter 1 explained above as shown in FIGS. 17 and 18. At the same time, the level of the surge current that flows in the series diodes 10 and 11 at the beginning of the switching operations of the first switch 5 and the second switch 7 can be suppressed. As a result, the EMI noise due to the surge current explained above can sufficiently be suppressed.

Figure 19:
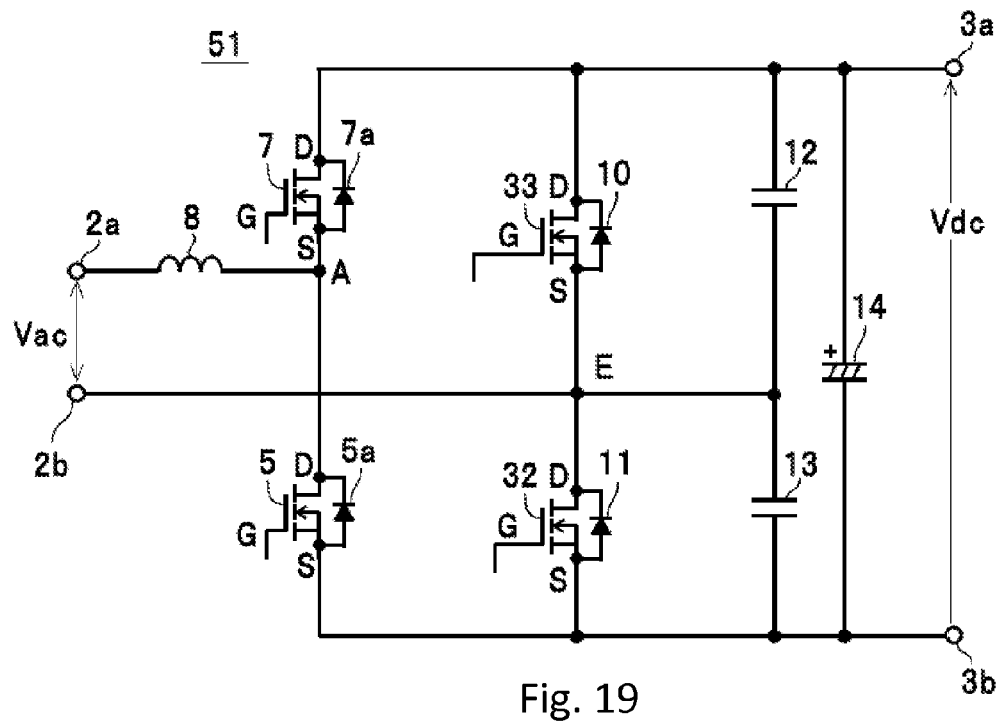
FIG. 19 is a circuit diagram of the converter 51 in which configurations of the converter 31 are applied according to an embodiment of the present invention.
Figure 20:
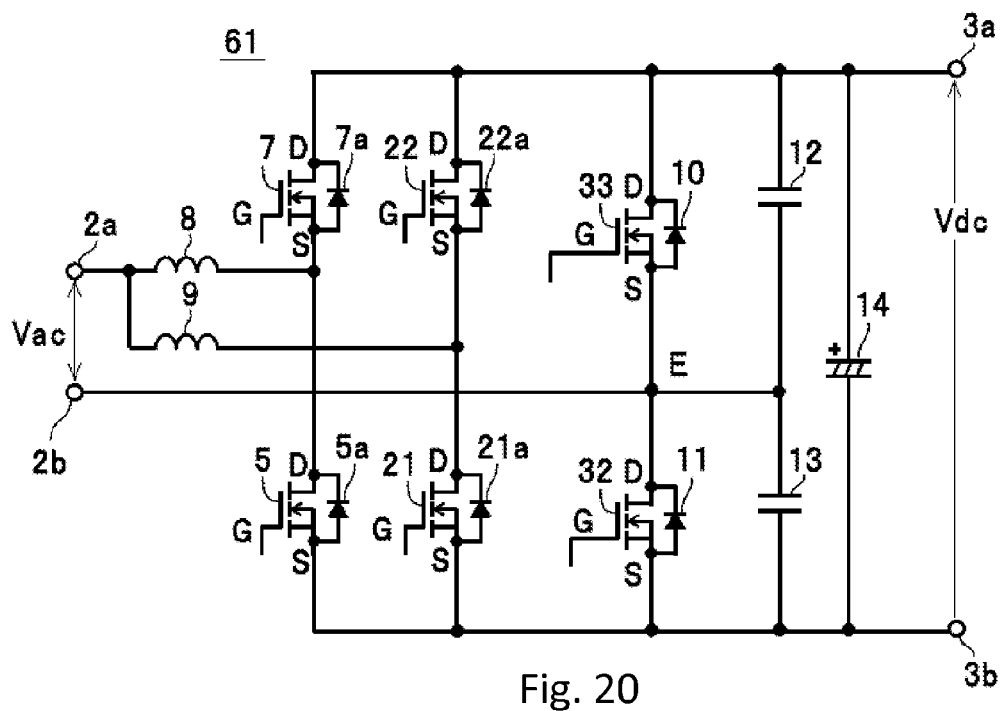
FIG. 20 is a circuit diagram of the converter 61 in which configurations of the converter 31 are applied according to an embodiment of the present invention.
Figure 21:
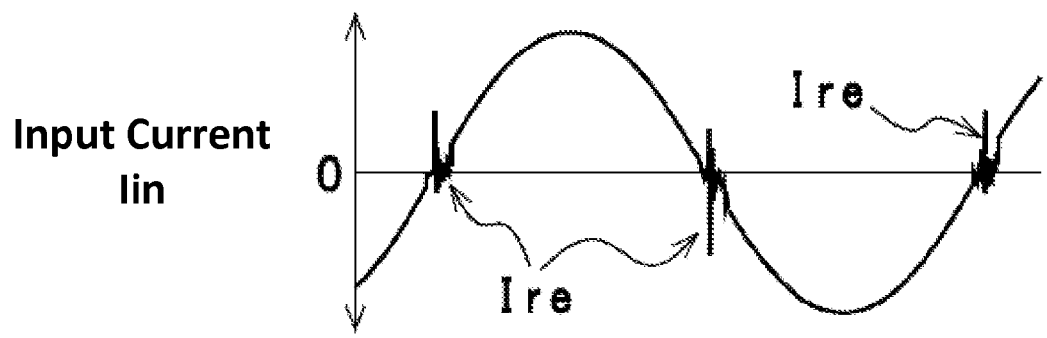
FIG. 21 is a waveform diagram to explain a superposition of a resonance current Ire to an input current Iin according to an embodiment of the present invention.

Further, in the converters 51 and 61, the level of the resonance current Ire, which is generated according to the voltage fluctuation in which the voltage of the node E is fluctuated by the DC voltage Vdc, can be sufficiently decreased (that is, can sufficiently decrease a noise outflow to the AC voltage Vac) by providing a pair of parallel capacitors 12 and 13, a first subordinate switch 32, a second subordinate switch 33 and a control circuit 35 in the same manner as the converters 31 explained above as shown in FIGS. 19 and 20. At the same time, the level of the surge current that flows in the series diodes 10 and 11 at the beginning of the switching operations of the first switch 5 and the second switch 7 can be suppressed. As a result, the EMI noise due to the surge current explained above can sufficiently be suppressed.

The bridgeless power factor improvement converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A bridgeless power factor improvement converter, comprising:
   a pair of input terminals to which an AC voltage is input, the pair of the input terminals including a first input terminal and a second input terminal;
   a pair of output terminals from which an output voltage is output, the pair of the output terminals including a first output terminal and a second output terminal, the first output terminal having a positive potential relative to the second output terminal;
   a first rectifier having a first current input terminal and a first current output terminal, the first current output terminal being connected to the first output terminal;
   a first switch that is connected between the second output terminal and the first current input terminal;
   a second rectifier having a second current input terminal and a second current output terminal, the second current input terminal being connected to the second output terminal;
   a second switch that is connected between the first output terminal and the second current output terminal;
   a first coil that is connected between the first input terminal and a first node connected between the first rectifier and the first switch;
   a second coil that is connected between the first input terminal and a second node connected between the second rectifier and the second switch;

a pair of series rectifiers that are connected in series in a forward direction via a third node and that have a series rectifier current input terminal and a series rectifier current output terminal, the series rectifier current output terminal being connected to the first output terminal, the series rectifier current input terminal being connected to the second output terminal, the third node being connected to the second input terminal;

a capacitor that is connected to at least one of the pair of the series rectifiers in parallel;

a first device that is configured by at least one of a third coil and a resistor and that has a first device terminal and a second device terminal, the first device terminal being connected to the third node;

a third switch that is connected between the second output terminal and the second device terminal;

a fourth switch that is connected between the first output terminal and the second device terminal;

a third rectifier having a third current input terminal and a third current output terminal, the third current input terminal being connected to the second output terminal, the third rectifier being connected to the third switch in parallel;

a fourth rectifier having a fourth current input terminal and a fourth current output terminal, the fourth current output terminal being connected to the first output terminal, the fourth rectifier being connected to the fourth switch in parallel; and a control circuit that selectively switches the first through fourth switches according to the AC voltage, wherein the control circuit switches only the first switch during a positive period in which the first input terminal has the positive potential relative to the second input terminal, the control circuit switches only the second switch during a negative period in which the first input terminal has a negative potential relative to the second input terminal, the control circuit maintains the third switch in an OFF state and shifts the fourth switch to an ON state during a first dead time period in which the first and second switches are in a dead time including a first change time from the positive period to the negative period, the control circuit shifts the third switch to the ON state and maintains the fourth switch in the OFF state during a second dead time period in which the first and second switches are in the dead time including a second change time from the negative period to the positive period, and the control circuit maintains the third and fourth switches in the OFF state during a period other than the first and second dead periods.

2. The bridgeless power factor improvement converter according to claim 1, wherein the capacitor is provided independently from the pair of the series rectifiers.

3. A bridgeless power factor improvement converter, comprising:

a pair of input terminals to which an AC voltage is input, the pair of the input terminals including a first input terminal and a second input terminal;

a pair of output terminals from which an output voltage is output, the pair of the output terminals including a first output terminal and a second output terminal, the first output terminal having a positive potential relative to the second output terminal;

a first rectifier having a first current input terminal and a first current output terminal, the first current output terminal being connected to the first output terminal;

a first switch that is connected between the second output terminal and the first current input terminal;

a second rectifier having a second current input terminal and a second current output terminal, the second current input terminal being connected to the second output terminal;

a second switch that is connected between the first output terminal and the second current output terminal;

a first coil that is connected between the first input terminal and a first node connected between the first rectifier and the first switch;

a second coil that is connected between the first input terminal and a second node connected between the second rectifier and the second switch;

a pair of series rectifiers that are connected in series in a forward direction via a third node and that have a series rectifier current input terminal and a series rectifier current output terminal, the series rectifier current output terminal being connected to the first output terminal, the series rectifier current input terminal being connected to the second output terminal, the third node being connected to the second input terminal;

a capacitor that is connected to at least one of the pair of the series rectifiers in parallel;

a first semiconductor switching element that is connected in parallel to one of the pair of the series rectifiers having the series rectifier current input terminal which is connected to the second output terminal;

a second semiconductor switching element that is connected in parallel to the other of the pair of the series rectifiers having the series rectifier current output terminal which is connected to the first output terminal; and a control circuit that selectively switches the first and second switches and the first and second semiconductor switching elements according to the AC voltage, wherein the control circuit switches only the first switch during a positive period in which the first input terminal has the positive potential relative to the second input terminal, the control circuit switches only the second switch during a negative period in which the first input terminal has a negative potential relative to the second input terminal, the control circuit shifts the first semiconductor switching element to an OFF state during a first dead time period in which the first and second switches are in a dead time including a first change time from the positive period to the negative period and during the second switch is in an ON state, the control circuit shifts the first semiconductor switching element to the ON state in a linear region during a second dead time period in which the first and second switches are in the dead time including a second change time from the negative period to the positive period, the control circuit shifts the first semiconductor switching element to one of the ON state and the OFF state in a saturation region during the first switch is in the ON state, the control circuit shifts the second semiconductor switching element to the OFF state during the second dead time period and during the first switch is in the ON state, the control circuit shifts the second semiconductor switching element to the ON state in the linear region during the first dead time period, and the control circuit shifts the second semiconductor switching element to one of the ON state and the OFF state in the saturation region during the second switch is in the ON state.

4. The bridgeless power factor improvement converter according to claim 3, wherein
the capacitor is provided independently from the pair of the series rectifiers.

5. A bridgeless power factor improvement converter, comprising:
a pair of input terminals to which an AC voltage is input, the pair of the input terminals including a first input terminal and a second input terminal;
a pair of output terminals from which an output voltage is output, the pair of the output terminals including a first output terminal and a second output terminal, the first output terminal having a positive potential relative to the second output terminal;
a first switch that is connected to the second output terminal;
a second switch that is connected between the first output terminal and the first switch in series;
a coil that is connected between the first input terminal and a first node connected between the first switch and the second switch;
a pair of series rectifiers that are connected in series in a forward direction via a second node and that have a series rectifier current input terminal and a series rectifier current output terminal, the series rectifier current output terminal being connected to the first output terminal, the series rectifier current input terminal being connected to the second output terminal, the second node being connected to the second input terminal;
a capacitor that is connected to at least one of the pair of the series rectifiers in parallel;
a first device that is configured by at least one of a second coil and a resistor and that has a first device terminal and a second device terminal, the first device terminal being connected to the second node;
a third switch that is connected between the second output terminal and the second device terminal;
a fourth switch that is connected between the first output terminal and the second device terminal;
a first rectifier having a first current input terminal and a first current output terminal, the first current input terminal being connected to the second output terminal, the first rectifier being connected to the third switch in parallel;
a second rectifier having a second current input terminal and a second current output terminal, the second current output terminal being connected to the first output terminal, the second rectifier being connected to the fourth switch in parallel; and
a control circuit that selectively switches the first through fourth switches according to the AC voltage, wherein
the control circuit switches only the first switch during a positive period in which the first input terminal has the positive potential relative to the second input terminal,
the control circuit switches only the second switch during a negative period in which the first input terminal has a negative potential relative to the second input terminal,
the control circuit maintains the third switch in an OFF state and shifts the fourth switch to an ON state during a first dead time period in which the first and second switches are in a dead time including a first change time from the positive period to the negative period,
the control circuit shifts the third switch to the ON state and maintains the fourth switch in the OFF state during a second dead time period in which the first and second switches are in the dead time including a second change time from the negative period to the positive period, and the control circuit maintains the third and fourth switches in the OFF state during a period other than the first and second dead periods.

6. The bridgeless power factor improvement converter according to claim 5, wherein
the capacitor is provided independently from the pair of the series rectifiers.

7. A bridgeless power factor improvement converter, comprising:
a pair of input terminals to which an AC voltage is input, the pair of the input terminals including a first input terminal and a second input terminal;
a pair of output terminals from which an output voltage is output, the pair of the output terminals including a first output terminal and a second output terminal, the first output terminal having a positive potential relative to the second output terminal;
a first switch that is connected to the second output terminal;
a second switch that is connected between the first output terminal and the first switch in series;
a coil that is connected between the first input terminal and a first node connected between the first switch and the second switch;
a pair of series rectifiers that are connected in series in a forward direction via a second node and that have a series rectifier current input terminal and a series rectifier current output terminal, the series rectifier current output terminal being connected to the first output terminal, the series rectifier current input terminal being connected to the second output terminal, the second node being connected to the second input terminal;
a capacitor that is connected to at least one of the pair of the series rectifiers in parallel;
a first semiconductor switching element that is connected in parallel to one of the pair of the series rectifiers having the series rectifier current input terminal which is connected to the second output terminal;
a second semiconductor switching element that is connected in parallel to the other of the pair of the series rectifiers having the series rectifier current output terminal which is connected to the first output terminal; and
a control circuit that selectively switches the first and second switches and the first and second semiconductor switching elements according to the AC voltage, wherein
the control circuit switches only the first switch during a positive period in which the first input terminal has the positive potential relative to the second input terminal,
the control circuit switches only the second switch during a negative period in which the first input terminal has a negative potential relative to the second input terminal,
the control circuit shifts the first semiconductor switching element to an OFF state during a first dead time period in which the first and second switches are in a dead time including a first change time from the positive period to the negative period and during the second switch is in an ON state,
the control circuit shifts the first semiconductor switching element to the ON state in a linear region during a second dead time period in which the first and second switches are in the dead time including a second change time from the negative period to the positive period,
the control circuit shifts the first semiconductor switching element to one of the ON state and the OFF state in a saturation region during the first switch is in the ON state, the control circuit shifts the second semiconductor switching element to the OFF state during the second dead time period and during the first switch is in the ON state, the control circuit shifts the second semiconductor switching element to the ON state in the linear region during the first dead time period, and the control circuit shifts the second semiconductor switching element to one of the ON state and the OFF state in the saturation region during the second switch is in the ON state.

8. The bridgeless power factor improvement converter according to claim 7, wherein the capacitor is provided independently from the pair of the series rectifiers.

* * * * *